United States Patent
Nishizawa

(10) Patent No.: US 10,091,397 B2
(45) Date of Patent: Oct. 2, 2018

(54) SYSTEM INCLUDING IMAGE FORMING APPARATUS AND LATTICE POINT GROUP GENERATING DEVICE THAT GENERATES GROUP OF PRE-COLOR CONVERSION LATTICE POINTS TO BE CONTAINED IN COLOR CONVERSION TABLE USED FOR CONVERSION OF COLORS IN RGB COLOR SPACE TO COLORS IN CMYK COLOR SPACE IN THE IMAGE FORMING APPARATUS

(71) Applicant: KYOCERA Document Solutions Inc., Osaka (JP)

(72) Inventor: Akira Nishizawa, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 15/250,434

(22) Filed: Aug. 29, 2016

(65) Prior Publication Data

US 2017/0064146 A1    Mar. 2, 2017

(30) Foreign Application Priority Data

Aug. 31, 2015  (JP) ................................. 2015-170661
Aug. 31, 2015  (JP) ................................. 2015-170663

(51) Int. Cl.
*H04N 1/60*    (2006.01)

(52) U.S. Cl.
CPC ... *H04N 1/6019* (2013.01); *H04N 2201/0094* (2013.01)

(58) Field of Classification Search
CPC .............. H04N 1/6025; H04N 1/6026; H04N 2201/0094; H04N 1/6019
See application file for complete search history.

(56) References Cited

U.S. PATENT DOCUMENTS 9,232,113 B2    1/2016   Miyanaga
2015/0116740 A1  4/2015   Miyanaga

FOREIGN PATENT DOCUMENTS

JP    2015-088968 A    5/2015

*Primary Examiner* — Christopher D Wait
(74) *Attorney, Agent, or Firm* — Studebaker & Brackett PC

(57) ABSTRACT

A lattice point group generating method generates a group of pre-color conversion lattice points to be contained in a color conversion table for conversion of colors in a color space having three channels to colors in another color space. The method includes generating sequences and generating lattice points. The generating sequences generates three van der Corput sequences in which the number of terms is equal to a quotient obtained by subtracting a specified number from a maximum number of lattice points allocatable to the color conversion table and dividing the difference by 12 or 6, and whose basis is a positive integer greater than or equal to 2. The generating lattice points generates lattice points each located at coordinates including terms in the same ordinal number out of the three respective van der Corput sequences for six possible associations of the three van der Corput sequences with the three channels.

2 Claims, 18 Drawing Sheets

SYSTEM INCLUDING IMAGE FORMING APPARATUS AND LATTICE POINT GROUP GENERATING DEVICE THAT GENERATES GROUP OF PRE-COLOR CONVERSION LATTICE POINTS TO BE CONTAINED IN COLOR CONVERSION TABLE USED FOR CONVERSION OF COLORS IN RGB COLOR SPACE TO COLORS IN CMYK COLOR SPACE IN THE IMAGE FORMING APPARATUS

INCORPORATION BY REFERENCE

The present application claims priority under 35 U.S.C. § 119 to Japanese Patent Application No. 2015-170661, filed on Aug. 31, 2015 and Japanese Patent Application No. 2015-170663, filed on Aug. 31, 2015. The contents of these applications are incorporated herein by reference in their entirety.

BACKGROUND

The present disclosure relates to a lattice point group generating method for generating a group of pre-color conversion lattice points to be contained in a color conversion table for conversion of colors in a color space having three channels to colors in another color space, a storage medium that stores therein a lattice point group generation program for generating a group of pre-color conversion lattice points to be contained in a color conversion table for conversion of colors in a color space having three channels to colors in another color space, and a lattice point group generating device for generating a group of pre-color conversion lattice points to be contained in a color conversion table for conversion of colors in a color space having three channels to colors in another color space.

A known color conversion table that is used for conversion of colors in a color space having three channels to colors in another color space is a color conversion table that is used for conversion of colors in an RGB color space to colors in a CMYK color space. When receiving RGB format image data, an image forming apparatus converts the RGB format image data to CMYK format image data using the color conversion table. The image forming apparatus then performs printing based on the CMYK format image data.

FIG. 22 is a diagram illustrating a typical color conversion table. As illustrated in FIG. 22, pre-color conversion lattice points are in a cubic lattice arrangement in the typical color conversion table. In a color conversion table in which pre-color conversion lattice points are in a cubic lattice arrangement, the number of lattice points per edge of the cubic lattice depends on the capacity of memory available to store lattice point information. A larger capacity of memory allows more lattice points to be stored per edge of the cubic lattice. However, the number of lattice points per edge of the cubic lattice is usually determined in view of desired accuracy of the quality of images to be output and component costs for the image forming apparatus. The number of lattice points necessary for a color conversion table in which pre-color conversion lattice points are in a cubic lattice arrangement is "the cube of N", wherein the number of lattice points per edge of the cubic lattice is N. Accordingly, the number of necessary lattice points increases with increase in the number N of lattice points per edge of the cubic lattice in proportion to the cube of N.

SUMMARY

A lattice point group generating method according to an aspect of the present disclosure generates a group of pre-color conversion lattice points to be contained in a color conversion table for conversion of colors in a color space having three channels to colors in another color space. The lattice point group generating method according to the aspect of the present disclosure includes generating sequences and generating lattice points. In the generating sequences, three van der Corput sequences are generated in which the number of terms is equal to a quotient obtained by subtracting a specified number from a maximum number of lattice points allocatable to the color conversion table and dividing the difference by 12 or 6, and whose basis is a positive integer greater than or equal to 2. In the generating lattice points, lattice points each located at coordinates including terms in the same ordinal number out of the three respective van der Corput sequences are generated for six possible associations of the three van der Corput sequences with the three channels.

A storage medium according to another aspect of the present disclosure is a non-transitory computer readable storage medium storing a lattice point group generation program executable by a computer for generating a group of pre-color conversion lattice points to be contained in a color conversion table for conversion of colors in a color space having three channels to colors in another color space. The lattice point group generation program includes a first program code and a second program code. The first program code causes the computer to generate three van der Corput sequences in which the number of terms is equal to a quotient obtained by subtracting a specified number from the maximum number of lattice points allocatable to the color conversion table and dividing the difference by 12 or 6, and whose basis is a positive integer greater than or equal to 2. The second program code causes the computer to generate lattice points each located at coordinates including terms in the same ordinal number out of the three respective van der Corput sequences for six possible associations of the three van der Corput sequences with the three channels.

A lattice point group generating device according to another aspect of the present disclosure generates a group of pre-color conversion lattice points to be contained in a color conversion table for conversion of colors in a color space having three channels to colors in another color space. The lattice point group generating device according to the aspect of the present disclosure includes a storage device and a controller. The storage device stores therein a lattice point group generation program. The controller executes the lattice point group generation program. By executing the lattice point group generation program, the controller generates three van der Corput sequences in which the number of terms is equal to a quotient obtained by subtracting a specified number from a maximum number of lattice points allocatable to the color conversion table and dividing the difference by 12 or 6, and whose basis is a positive integer greater than or equal to 2. By executing the lattice point group generation program, furthermore, the controller generates lattice points each located at coordinates including terms in the same ordinal number out of the three respective van der Corput sequences for six possible associations of the three van der Corput sequences with the three channels.

DETAILED DESCRIPTION

Figure 1:
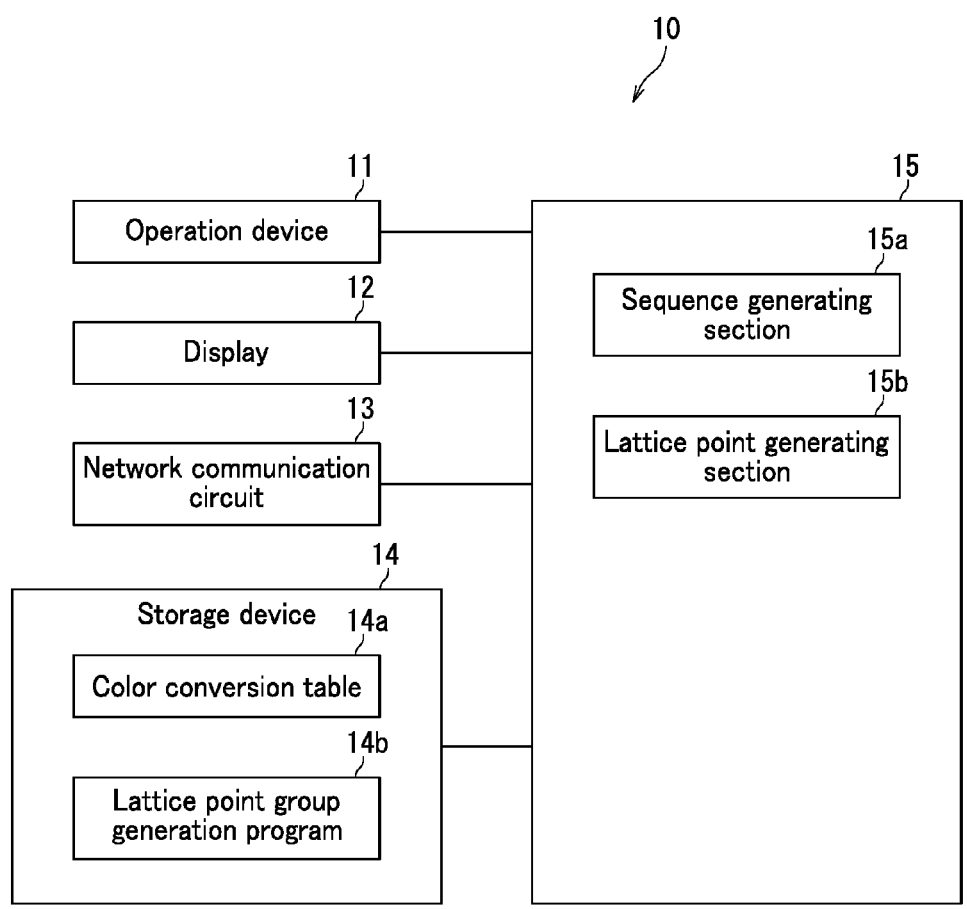
FIG. 1 is a diagram illustrating a block configuration of a color conversion table generating device according to a first embodiment of the present disclosure.

The following describes embodiments of the present disclosure using the accompanying drawings. Note that in the drawings, elements that are the same or equivalent are labelled using the same reference signs and description thereof is not repeated.

First Embodiment

First, a configuration of a color conversion table generating device according to a first embodiment will be described.

Figure 2:
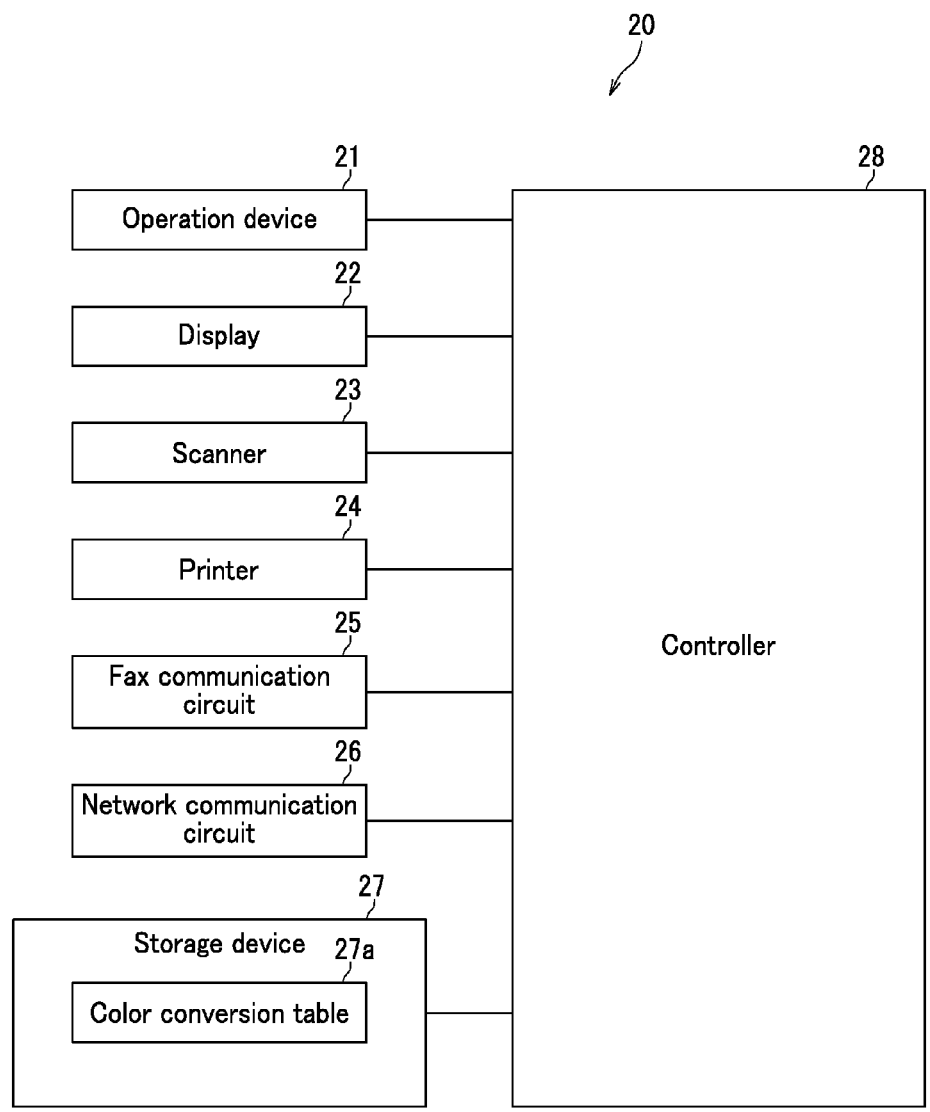
FIG. 2 is a diagram illustrating a block configuration of a multifunction peripheral (MFP) according to the first embodiment.

FIG. 1 is a diagram illustrating a block configuration of a color conversion table generating device 10 according to the first embodiment. FIG. 2 is a diagram illustrating a block configuration of a multifunction peripheral (MFP) 20 according to the first embodiment. A color conversion table generated by the color conversion table generating device 10 is stored in the MFP 20. The MFP 20 is an example of an image forming apparatus.

As illustrated in FIG. 1, the color conversion table generating device 10 includes an operation device 11, a display 12, a network communication circuit 13, a storage device 14, and a controller 15. The color conversion table generating device 10 may be a computer such as a personal computer (PC).

The operation device 11 may be an input device such as a mouse and a keyboard. The operation device 11 is operated by a user. The color conversion table generating device 10 performs a process in accordance with a user's operation of the operation device 11. The operation device 11 for example includes either or both of a mouse and a keyboard.

The display 12 displays various types of information. The display 12 may be a display device such as a liquid crystal display (LCD). The display 12 for example includes an LCD.

The network communication circuit 13 may be a communication device that performs communication with external devices via a network such as a local area network (LAN) and the Internet.

The storage device 14 stores a program and various types of data therein. The storage device 14 may be a hard disk drive (HDD). The storage device 14 for example includes an HDD.

The controller 15 performs overall control of the color conversion table generating device 10.

The storage device 14 can store a color conversion table 14a for the MFP 20 (see FIG. 2). The color conversion table 14a is a table that is used for conversion of colors in an RGB color space to colors in a CMYK color space.

The storage device 14 stores a lattice point group generation program 14b for generating a group of pre-color conversion lattice points to be contained in the color conversion table 14a. The lattice point group generation program 14b is installed on the color conversion table generating device 10 during production of the color conversion table generating device 10. Alternatively, the lattice point group generation program 14b can be additionally installed on the color conversion table generating device 10 from an external storage medium such as a compact disk (CD), a digital versatile disk (DVD), or a universal serial bus (USB) memory device. Alternatively, the lattice point group generation program 14b can be additionally installed on the color conversion table generating device 10 via a network.

The controller 15 for example includes a central processing unit (CPU), read only memory (ROM), and random access memory (RAM). A program and various types of data are stored in the ROM. The RAM is used as a work area of the CPU. The CPU executes a program stored in the ROM or the storage device 14.

The controller 15 functions as a sequence generating section 15a and a lattice point generating section 15b by executing the lattice point group generation program 14b stored in the storage device 14. The sequence generating section 15a (controller 15) generates three van der Corput sequences in which the number of terms is equal to a quotient obtained by subtracting a specified number from the maximum number of lattice points allocatable to the color conversion table 14a and dividing the difference by 12, and whose basis is a positive integer greater than or equal to 2. The lattice point generating section 15b (controller 15) associates the three van der Corput sequences generated by the sequence generating section 15a with three channels of an RGB color space in one-to-one correspondence. The lattice point generating section 15b (controller 15) generates lattice points each located at coordinates including terms in the same ordinal number out of the three respective van der Corput sequences for six possible associations of the three van der Corput sequences with the three channels of the RGB color space. Thereafter, the lattice point generating section 15b (controller 15) further generates lattice points of colors complementary to those of the lattice points generated earlier.

The following describes the configuration of the MFP 20 illustrated in FIG. 2.

FIG. 2 is a diagram illustrating a block configuration of the MFP 20 according to the first embodiment.

As illustrated in FIG. 2, the MFP 20 includes an operation device 21, a display 22, a scanner 23, a printer 24, a fax communication circuit 25, a network communication circuit 26, a storage device 27, and a controller 28.

The operation device 21 may be an input device such as buttons. The operation device 21 is operated by a user. The MFP 20 performs a process or an operation in accordance with a user's operation of the operation device 21. The operation device 21 for example includes buttons.

The display 22 displays various types of information. The display 22 may be a display device such as an LCD. The display 22 for example includes an LCD.

The scanner 23 may be a reading device that reads an image.

The printer 24 may be a printing device that performs printing on a recording medium such as paper.

The fax communication circuit 25 may be a facsimile device that performs fax communication with external facsimile devices, not illustrated, via a communication line such as a public telephone line.

The network communication circuit 26 may be a communication device that performs communication with external devices via a network such as a LAN and the Internet.

The storage device 27 stores various types of data therein. The storage device 27 may be a storage device such as semiconductor memory and an HDD. The storage device 27 for example includes either or both of semiconductor memory and an HDD.

The controller 28 performs overall control of the MFP 20.

The storage device 27 can store a color conversion table 27a that is used for conversion of colors in an RGB color space to colors in a CMYK color space.

The controller 28 for example includes a CPU, ROM, and RAM. A program and various types of data are stored in the ROM. The RAM is used as a work area of the CPU. The CPU executes a program stored in the ROM or the storage device 27.

The following describes an operation of the color conversion table generating device 10.

Figure 3:
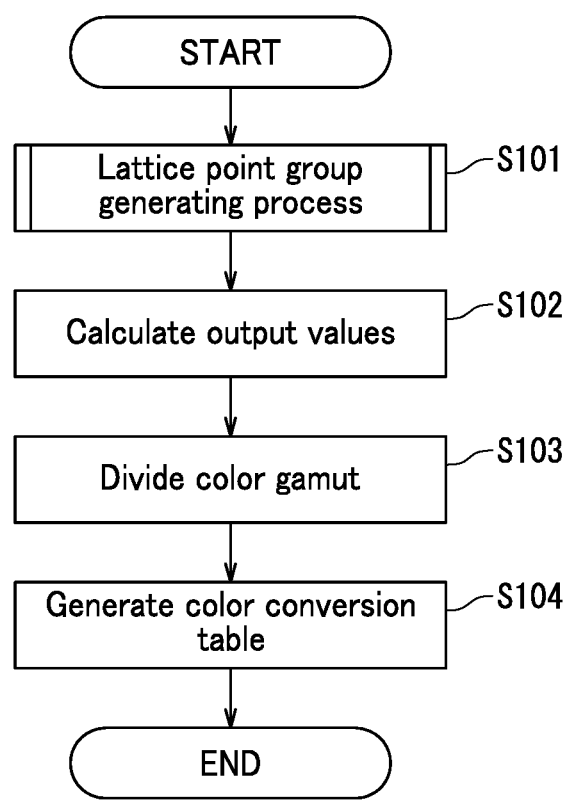
FIG. 3 is a flowchart of an operation of the color conversion table generating device according to the first embodiment.

FIG. 3 is a flowchart of an operation of the color conversion table generating device 10 according to the first embodiment. More specifically, FIG. 3 illustrates an operation of the color conversion table generating device 10 for generating the color conversion table 14a.

As illustrated in FIG. 3, the controller 15 of the color conversion table generating device 10 performs a lattice point group generating process of generating a group of pre-color conversion lattice points to be contained in the color conversion table 14a (Step S101).

Figure 4:
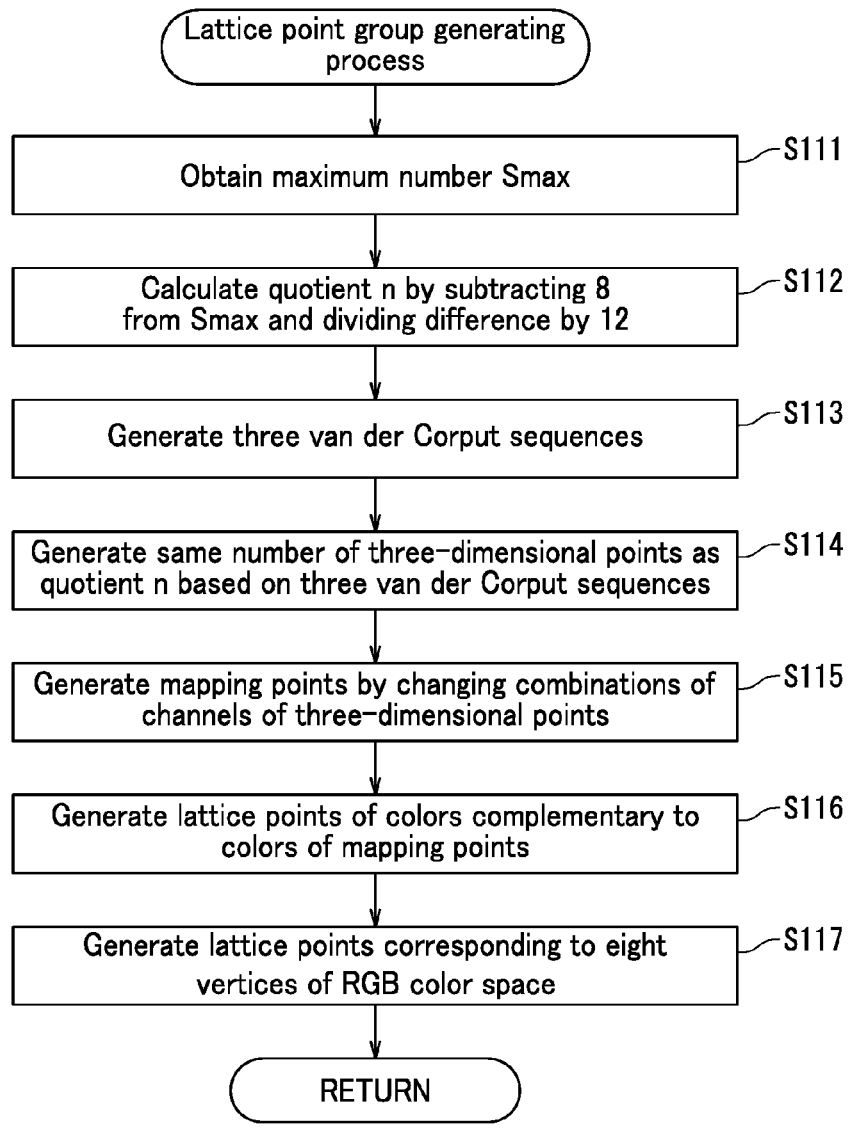
FIG. 4 is a flowchart of a lattice point group generating process according to the first embodiment.

FIG. 4 is a flowchart of the lattice point group generating process according to the first embodiment.

As illustrated in FIG. 4, the sequence generating section 15a obtains a maximum number Smax of lattice points allocatable to the color conversion table 14a for the storage device 27 of the MFP 20 (Step S111). The maximum number Smax is determined depending on the capacity of the storage device 27 of the MFP 20.

Next, the sequence generating section 15a calculates a quotient n by subtracting 8 from the maximum number Smax obtained in Step S111 and dividing the difference by 12 (Step S112). In Step S112, an equation shown below may for example be used.

$$n = \mathrm{FLOOR}\left[\frac{S\max - 8}{12}\right]$$

Next, the sequence generating section 15a generates three van der Corput sequences in which the number of terms is equal to the quotient n obtained in Step S112 and whose basis is a positive integer greater than or equal to 2 (Step S113).

Next, the lattice point generating section 15b performs nesting on the three van der Corput sequences generated in Step S113. The lattice point generating section 15b performs a matrix transformation on the nested array to acquire an array having "n rows and three columns". As a result, a group of three-dimensional points are generated (Step S114). The number of three-dimensional points is equal to the quotient n.

Next, the lattice point generating section 15b generates a group of mapping points by changing combinations of the three channels (three channels of colors in the RGB color space) of the three-dimensional points generated in Step S114 (Step S115). The group of mapping points are part of the group of lattice points to be contained in the color conversion table 14a.

Next, the lattice point generating section 15b generates a group of lattice points of colors complementary to those of the group of lattice points generated in Step S115 (Step S116). The group of lattice points of complementary colors are part of the group of lattice points to be contained in the color conversion table 14a. For example, the lattice point generating section 15b generates a lattice point {1−r, 1−g, 1−b} of a color complementary to a color of a lattice point {r, g, b} generated in Step S115. Next, the lattice point generating section 15b generates lattice points corresponding to eight vertices of the RGB color space (Step S117).

These eight lattice points are part of the group of lattice points to be contained in the color conversion table 14a. More specifically, the lattice point generating section 15b generates lattice points at $\{r, g, b\}$ corresponding to points $\{0, 0, 0\}, \{0, 0, 1\}, \{0, 1, 0\}, \{0, 1, 1\}, \{1, 0, 0\}, \{1, 0, 1\}, \{1, 1, 0\}$, and $\{1, 1, 1\}$. After completion of Step S117, the operation illustrated in FIG. 4 comes to an end.

Examples of the van der Corput sequences that are generated by the sequence generating section 15a in Step S113 include van der Corput sequences shown below.

van der Corput sequence having a basis of 2

$$\left\{\frac{1}{2}, \frac{1}{4}, \frac{3}{4}, \frac{1}{8}, \frac{5}{8}, \frac{3}{8}, \frac{7}{8}, \frac{1}{16}, \frac{9}{16}, \frac{5}{16} \ldots\right\}$$

van der Corput sequence having a basis of 3

$$\left\{\frac{1}{3}, \frac{2}{3}, \frac{1}{9}, \frac{4}{9}, \frac{7}{9}, \frac{2}{9}, \frac{5}{9}, \frac{8}{9}, \frac{1}{27}, \frac{10}{27} \ldots\right\}$$

van der Corput sequence having a basis of 5

$$\left\{\frac{1}{5}, \frac{2}{5}, \frac{3}{5}, \frac{4}{5}, \frac{1}{25}, \frac{6}{25}, \frac{11}{25}, \frac{16}{25}, \frac{21}{25}, \frac{2}{25} \ldots\right\}$$

van der Corput sequence having a basis of 7

$$\left\{\frac{1}{7}, \frac{2}{7}, \frac{3}{7}, \frac{4}{7}, \frac{5}{7}, \frac{6}{7}, \frac{1}{49}, \frac{8}{49}, \frac{15}{49}, \frac{22}{49} \ldots\right\}$$

van der Corput sequence having a basis of 9

$$\left\{\frac{1}{9}, \frac{2}{9}, \frac{1}{3}, \frac{4}{9}, \frac{5}{9}, \frac{2}{3}, \frac{7}{9}, \frac{8}{9}, \frac{1}{81}, \frac{10}{81} \ldots\right\}$$

In a case where the sequence generating section 15a generates three van der Corput sequences respectively having a basis of 2, 3, and 5 in Step S113, for example, the lattice point generating section 15b generates a group of three-dimensional points represented by expression (1) shown below in Step S114.

$$\left\{\left\{\frac{1}{2}, \frac{1}{3}, \frac{1}{5}\right\}, \left\{\frac{1}{4}, \frac{2}{3}, \frac{2}{5}\right\}, \left\{\frac{3}{4}, \frac{1}{9}, \frac{3}{5}\right\}, \right. \\ \left\{\frac{1}{8}, \frac{4}{9}, \frac{4}{5}\right\}, \left\{\frac{5}{8}, \frac{7}{9}, \frac{1}{25}\right\}, \left\{\frac{3}{8}, \frac{2}{9}, \frac{6}{25}\right\}, \left\{\frac{7}{8}, \frac{5}{9}, \frac{11}{25}\right\}, \\ \left. \left\{\frac{1}{16}, \frac{8}{9}, \frac{16}{25}\right\}, \left\{\frac{9}{16}, \frac{1}{27}, \frac{21}{25}\right\}, \left\{\frac{5}{16}, \frac{10}{27}, \frac{2}{25}\right\} \ldots\right\} \quad (1)$$

The RGB color space has three channels of R values, G values, and B values, and there are following six possible combinations (ways of interchanging) of the three channels: $\{r, g, b\}, \{r, b, g\}, \{g, r, b\}, \{g, b, r\}, \{b, r, g\}$, and $\{b, g, r\}$.

The lattice point generating section 15b generates a group of mapping points $\{r, g, b\}$ represented by the expression (1) as part of the group of lattice points to be contained in the color conversion table 14a when associating the combination $\{r, g, b\}$ with the group of three-dimensional points represented by the expression (1) in Step S115.

The lattice point generating section 15b generates a group of mapping points $\{r, g, b\}$ represented by expression (2) shown below as part of the group of lattice points to be contained in the color conversion table 14a when associating the combination $\{r, b, g\}$ with the group of three-dimensional points represented by the expression (1) in Step S115.

$$\left\{\left\{\frac{1}{2}, \frac{1}{5}, \frac{1}{3}\right\}, \left\{\frac{1}{4}, \frac{2}{5}, \frac{2}{3}\right\}, \left\{\frac{3}{4}, \frac{3}{5}, \frac{1}{9}\right\}, \right. \\ \left\{\frac{1}{8}, \frac{4}{5}, \frac{4}{9}\right\}, \left\{\frac{5}{8}, \frac{1}{25}, \frac{7}{9}\right\}, \left\{\frac{3}{8}, \frac{6}{25}, \frac{2}{9}\right\}, \left\{\frac{7}{8}, \frac{11}{25}, \frac{5}{9}\right\}, \\ \left. \left\{\frac{1}{16}, \frac{16}{25}, \frac{8}{9}\right\}, \left\{\frac{9}{16}, \frac{21}{25}, \frac{1}{27}\right\}, \left\{\frac{5}{16}, \frac{2}{25}, \frac{10}{27}\right\} \ldots\right\} \quad (2)$$

The lattice point generating section 15b generates a group of mapping points $\{r, g, b\}$ represented by expression (3) shown below as part of the group of lattice points to be contained in the color conversion table 14a when associating the combination $\{g, r, b\}$ with the group of three-dimensional points represented by the expression (1) in Step S115.

$$\left\{\left\{\frac{1}{3}, \frac{1}{2}, \frac{1}{5}\right\}, \left\{\frac{2}{3}, \frac{1}{4}, \frac{2}{5}\right\}, \left\{\frac{1}{9}, \frac{3}{4}, \frac{3}{5}\right\}, \right. \\ \left\{\frac{4}{9}, \frac{1}{8}, \frac{4}{5}\right\}, \left\{\frac{7}{9}, \frac{5}{8}, \frac{1}{25}\right\}, \left\{\frac{2}{9}, \frac{3}{8}, \frac{6}{25}\right\}, \left\{\frac{5}{9}, \frac{7}{8}, \frac{11}{25}\right\}, \\ \left. \left\{\frac{8}{9}, \frac{1}{16}, \frac{16}{25}\right\}, \left\{\frac{1}{27}, \frac{9}{16}, \frac{21}{25}\right\}, \left\{\frac{10}{27}, \frac{5}{16}, \frac{2}{25}\right\} \ldots\right\} \quad (3)$$

The lattice point generating section 15b generates a group of mapping points $\{r, g, b\}$ represented by expression (4) shown below as part of the group of lattice points to be contained in the color conversion table 14a when associating the combination $\{g, b, r\}$ with the group of three-dimensional points represented by the expression (1) in Step S115.

$$\left\{\left\{\frac{1}{5}, \frac{1}{2}, \frac{1}{3}\right\}, \left\{\frac{2}{5}, \frac{1}{4}, \frac{2}{3}\right\}, \left\{\frac{3}{5}, \frac{3}{4}, \frac{1}{9}\right\}, \right. \\ \left\{\frac{4}{5}, \frac{1}{8}, \frac{4}{9}\right\}, \left\{\frac{1}{25}, \frac{5}{8}, \frac{7}{9}\right\}, \left\{\frac{6}{25}, \frac{3}{8}, \frac{2}{9}\right\}, \left\{\frac{11}{25}, \frac{7}{8}, \frac{5}{9}\right\}, \\ \left. \left\{\frac{16}{25}, \frac{1}{16}, \frac{8}{9}\right\}, \left\{\frac{21}{25}, \frac{9}{16}, \frac{1}{27}\right\}, \left\{\frac{2}{25}, \frac{5}{16}, \frac{10}{27}\right\} \ldots\right\} \quad (4)$$

The lattice point generating section 15b generates a group of mapping points $\{r, g, b\}$ represented by expression (5) shown below as part of the group of lattice points to be contained in the color conversion table 14a when associating the combination $\{b, r, g\}$ with the group of three-dimensional points represented by the expression (1) in Step S115.

$$\left\{\left\{\frac{1}{3}, \frac{1}{5}, \frac{1}{2}\right\}, \left\{\frac{2}{3}, \frac{2}{5}, \frac{1}{4}\right\}, \left\{\frac{1}{9}, \frac{3}{5}, \frac{3}{4}\right\}, \right. \\ \left\{\frac{4}{9}, \frac{4}{5}, \frac{1}{8}\right\}, \left\{\frac{7}{9}, \frac{1}{25}, \frac{5}{8}\right\}, \left\{\frac{2}{9}, \frac{6}{25}, \frac{3}{8}\right\}, \left\{\frac{5}{9}, \frac{11}{25}, \frac{7}{8}\right\}, \\ \left. \left\{\frac{8}{9}, \frac{16}{25}, \frac{1}{16}\right\}, \left\{\frac{1}{27}, \frac{21}{25}, \frac{9}{16}\right\}, \left\{\frac{10}{27}, \frac{2}{25}, \frac{5}{16}\right\} \ldots\right\} \quad (5)$$

The lattice point generating section 15b generates a group of mapping points $\{r, g, b\}$ represented by expression (6) shown below as part of the group of lattice points to be contained in the color conversion table 14a when associating the combination {b, g, r} with the group of three-dimensional points represented by the expression (1) in Step S115.

$$\left\{ \left\{ \frac{1}{5}, \frac{1}{3}, \frac{1}{2} \right\}, \left\{ \frac{2}{5}, \frac{2}{3}, \frac{1}{4} \right\}, \left\{ \frac{3}{5}, \frac{1}{9}, \frac{3}{4} \right\}, \right. \\ \left\{ \frac{4}{5}, \frac{4}{9}, \frac{1}{8} \right\}, \left\{ \frac{1}{25}, \frac{7}{9}, \frac{5}{8} \right\}, \left\{ \frac{6}{25}, \frac{2}{9}, \frac{3}{8} \right\}, \left\{ \frac{11}{25}, \frac{5}{9}, \frac{7}{8} \right\}, \\ \left. \left\{ \frac{16}{25}, \frac{8}{9}, \frac{1}{16} \right\}, \left\{ \frac{21}{25}, \frac{1}{27}, \frac{9}{16} \right\}, \left\{ \frac{2}{25}, \frac{10}{27}, \frac{5}{16} \right\} \dots \right\}$$ (6)

That is, the lattice point generating section 15b associates the three van der Corput sequences generated by the sequence generating section 15a in Step S113 with the three channels of R values, G values, and B values in one-to-one correspondence. The lattice point generating section 15b generates lattice points each located at coordinates including terms in the same ordinal number out of the three respective van der Corput sequences for six possible associations of the three van der Corput sequences with the three channels of the R values, the G values, and the B values. Thus, in a case where the sequence generating section 15a generates in Step S113 three van der Corput sequences having a basis of 2, 3, and 5, respectively, the lattice point generating section 15b generates a group of lattice points illustrated in FIGS. 5A and 5B in Steps S115 to S117.

Figure 5A:
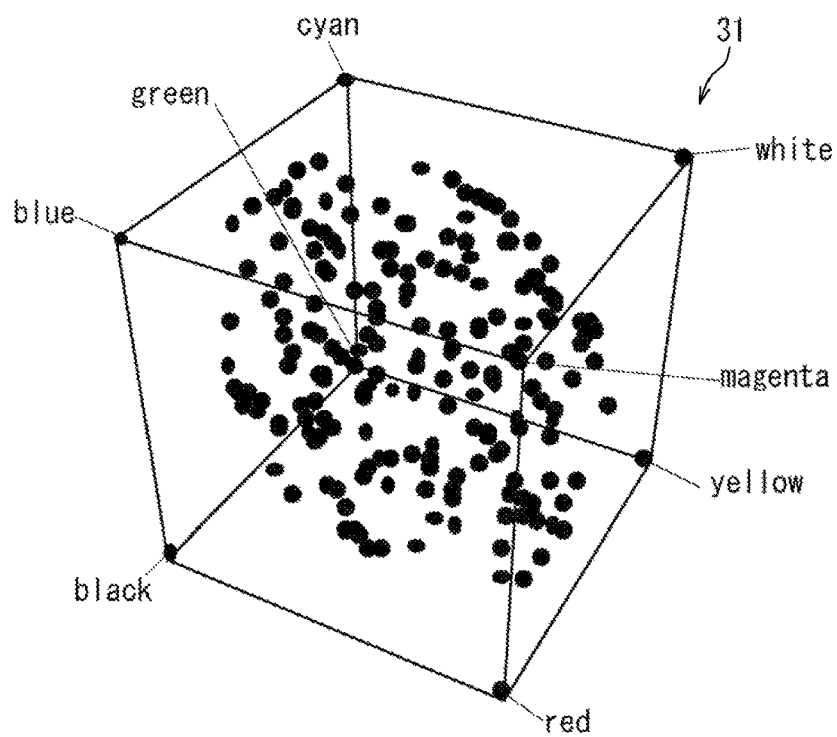
FIG. 5A is a perspective view of a group of lattice points generated by the color conversion table generating device according to the first embodiment in a case where three van der Corput sequences having a basis of 2, 3, and 5, respectively, are generated.
Figure 5B:
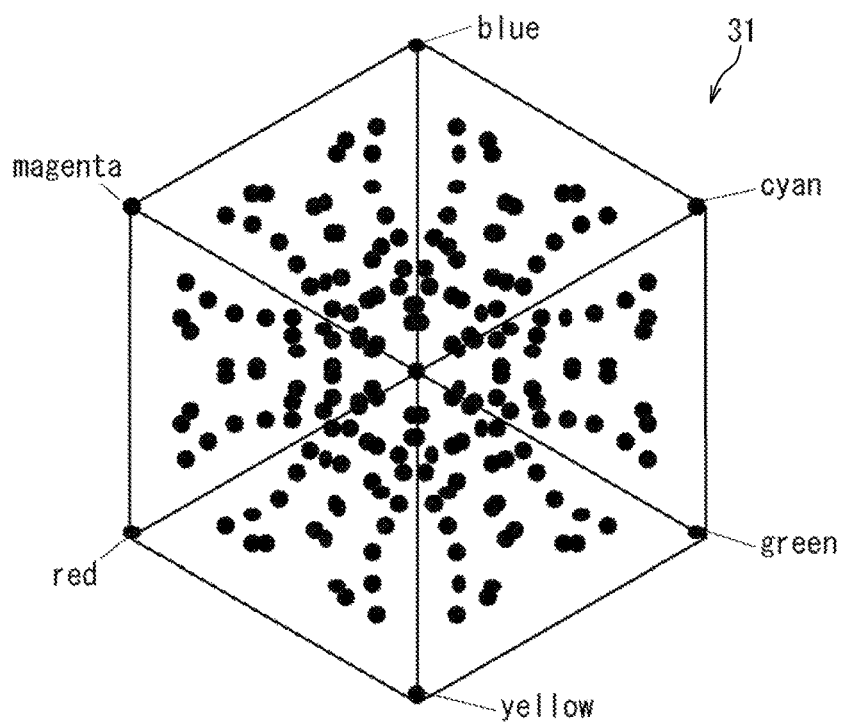
FIG. 5B is a perspective view of the group of lattice points illustrated in FIG. 5A observed in a direction from a white point toward a black point.

FIG. 5A is a perspective view of a group of lattice points 31 generated by the color conversion table generating device 10 according to the first embodiment in a case where three van der Corput sequences having a basis of 2, 3, and 5, respectively, are generated. FIG. 5B is a perspective view of the group of lattice points 31 illustrated in FIG. 5A observed in a direction from a white point {1, 1, 1} toward a black point {0, 0, 0}.

As a result of interchanging the channel information of the coordinates of the lattice points in Step S115, the group of lattice points 31 are distributed symmetrically with respect to each of six base hues: red, green, blue, cyan, magenta, and yellow as illustrated in FIG. 5B.

Sequences obtained by generalizing van der Corput sequences to multiple dimensions with primes are referred to as Halton sequences. Therefore, a group of three-dimensional points generated in Step S114 based on three van der Corput sequences each having a basis being a prime such as the group of three-dimensional points generated in Step S114 based on the three van der Corput sequences having a basis of 2, 3, and 5, respectively, are Halton sequences. Halton sequences have high randomness. It is therefore possible to improve uniformity of the lattice point arrangement by generating Halton sequences in Step S114. Thus, Halton sequences are preferably generated in Step S114. The basis of each of the three van der Corput sequences that are generated in Step S113 may not be a prime. In a case where the basis of each of the three van der Corput sequences is not a prime, the sequences have reduced randomness, and the group of three-dimensional points (lattice points) to be generated in Step S114 are in a crystalline structure-like arrangement. However, according to the present embodiment, the lattice point generating section 15b arranges the group of lattice points symmetrically with respect to each of the six base hues by interchanging the channel information of the coordinates of the lattice points in Step S115. Furthermore, in Step S116, the lattice point generating section 15b also generates the group of lattice points of colors complementary to those of the group of lattice points generated in Step S115. Thus, uniformity of the lattice point arrangement can be ensured even if the basis of each of the three van der Corput sequences generated in Step S113 is not a prime. In a case where three van der Corput sequences having a basis of 2, 3, and 9, respectively, are generated, for example, the color conversion table generating device 10 according to the first embodiment generates a group of lattice points 32 illustrated in FIGS. 6A and 6B.

Figure 6A:
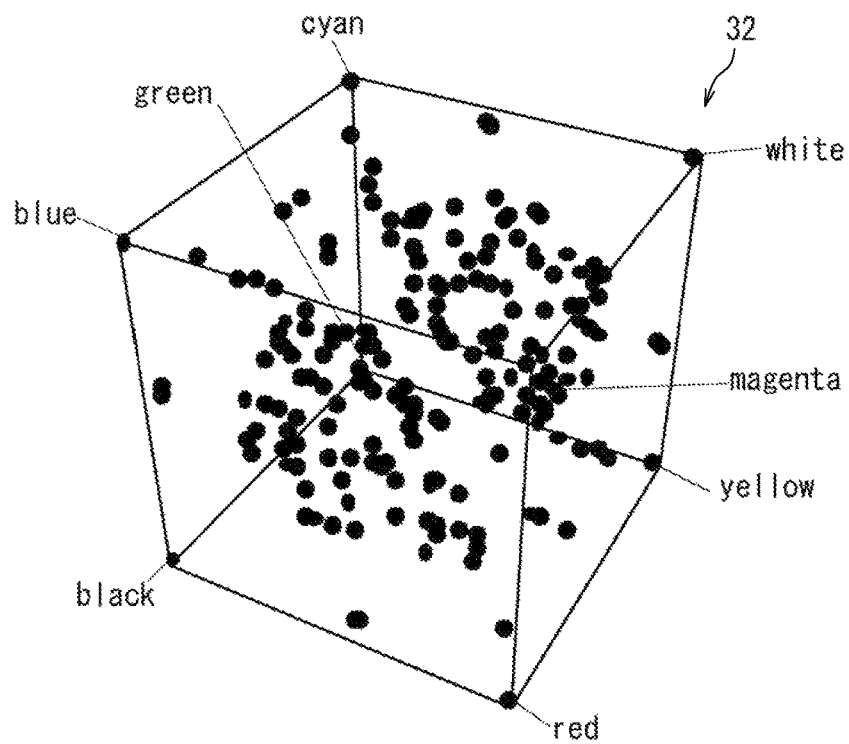
FIG. 6A is a perspective view of a group of lattice points generated by the color conversion table generating device according to the first embodiment in a case where three van der Corput sequences having a basis of 2, 3, and 9, respectively, are generated.
Figure 6B:
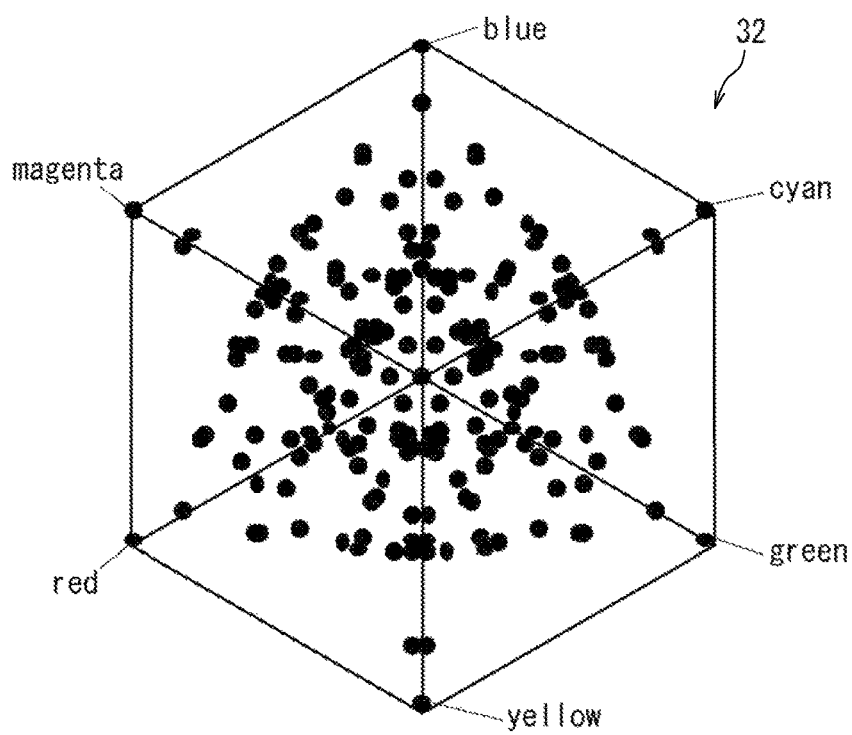
FIG. 6B is a perspective view of the group of lattice points illustrated in FIG. 6A observed in a direction from a white point toward a black point.

FIG. 6A is a perspective view of the group of lattice points 32 generated by the color conversion table generating device 10 according to the first embodiment in a case where the three van der Corput sequences having a basis of 2, 3, and 9, respectively, are generated. FIG. 6B is a perspective view of the group of lattice points 32 illustrated in FIG. 6A observed in a direction from a white point toward a black point.

As a result of interchanging the channel information of the coordinates of the lattice points in Step S115, the group of lattice points 32 are distributed symmetrically with respect to each of six base hues: red, green, blue, cyan, magenta, and yellow as illustrated in FIG. 6B.

Subsequent to completion of the lattice point group generating process in Step S101, as illustrated in FIG. 3, the controller 15 calculates an output value (CMYK value) for each lattice point of the groups of lattice points generated in the lattice point group generating process (Step S102).

The output value (CMYK value) is calculated using a lookup table (LUT) obtained by performing inverse calculation on a "LUT containing correspondences between predetermined color values and values of colors that are measured".

Alternatively, the output value (CMYK value) is calculated using a "prepared color conversion LUT in a fine mesh structure".

First, description is given of a method by which the output value (CMYK value) for each lattice point of the groups of lattice points generated in the lattice point group generating process is determined using the LUT obtained by performing inverse calculation on the "LUT containing correspondences between predetermined color values and values of colors that are measured".

The "LUT containing correspondences between predetermined color values and values of colors that are measured" is a LUT obtained by printing color patches of various predetermined color values in CMYK values using the MFP 20, measuring colors of the printed color patches, and then converting the thus measured values (values of colors that are measured) to XYZ values. That is, the LUT is used for "CMYK to XYZ conversion". Hereinafter, the LUT may be referred to as "a LUT (CMYK to XYZ conversion)". As the color patches, color patches of CMYK values at predetermined intervals may be used. Alternatively, color patches of randomized CMYK values may be used as the color patches. The LUT (CMYK to XYZ conversion) may be a LUT that is used for development of the color conversion table 14a. Typically, the LUT (CMYK to XYZ conversion) that is used for development of the color conversion table 14a is created using color patches of CMYK values at discrete intervals determined such that stratification can be performed based on Bk values. The LUT (CMYK to XYZ conversion) that is used for development of the color conversion table 14a is not stored in the MFP 20. Accordingly, unlike the color conversion table 14a, the LUT (CMYK to XYZ conversion) that is used for development of the color conversion table 14a is not particularly restricted by the capacity of memory in which the LUT (CMYK to XYZ conversion) is stored. The LUT (CMYK to XYZ conversion) that is used for development of the color conversion table 14a therefore contains correspondences between an extremely large number of CMYK values and XYZ values.

The LUT obtained by performing inverse calculation on the LUT (CMYK to XYZ conversion) is a LUT that is used for conversion of XYZ values to CMYK values. That is, this LUT is used for "XYZ to CMYK conversion". Hereinafter, this LUT may be referred to as a LUT (XYZ to CMYK conversion).

XYZ values to which the respective lattice points (RGB values) of the groups of lattice points generated in the lattice point group generating process in Step S101 correspond can be known by referring to a LUT that is used for "RGB to XYZ conversion". Hereinafter, this LUT may be referred to as a LUT (RGB to XYZ conversion).

"RGB to CMYK conversion" can be performed using a combination of the LUT (RGB to XYZ conversion) and the LUT (XYZ to CMYK conversion). Accordingly, the output value (CMYK value) for each lattice point of the groups of lattice points generated in the lattice point group generating process can be determined by using a combination of the LUT (XYZ to CMYK conversion) and the LUT (RGB to XYZ conversion).

Next, description is given of a method by which the output value (CMYK value) for each lattice point of the groups of lattice points generated in the lattice point group generating process is determined using the "prepared color conversion LUT in a fine mesh structure". Hereinafter, the "prepared color conversion LUT in a fine mesh structure" may be referred to simply as "a color conversion LUT".

The color conversion LUT is a LUT showing output values (CMYK values) corresponding to input values (RGB values) in the MFP 20. That is, the color conversion LUT is used for "RGB to CMYK conversion". The color conversion LUT may be a LUT that is used for development of the color conversion table 14a. The color conversion LUT that is used for development of the color conversion table 14a is not stored in the MFP 20. Accordingly, unlike the color conversion table 14a, the color conversion LUT that is used for development of the color conversion table 14a is not particularly restricted by the capacity of memory in which the color conversion LUT is stored. The color conversion LUT that is used for development of the color conversion table 14a therefore contains correspondences between an extremely large number of RGB values and CMYK values.

Figure 7:
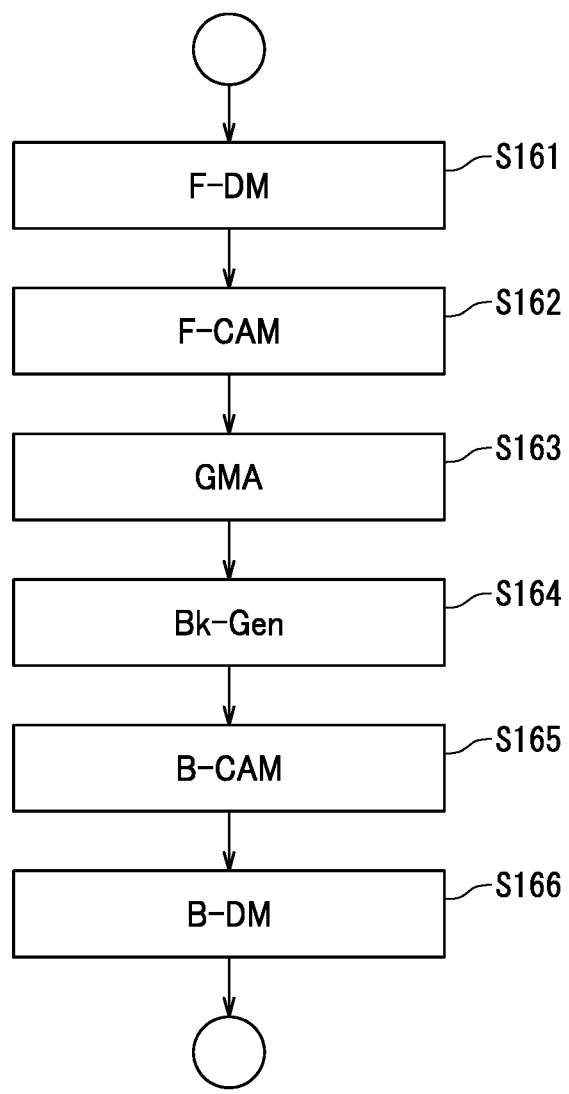
FIG. 7 is a flowchart of typical conversion steps of a color conversion process.

More specifically, a multistep LUT process as illustrated in FIG. 7 is performed for determining the output value (CMYK value) using the color conversion LUT.

The following describes the LUT process illustrated in FIG. 7.

FIG. 7 is a flowchart of typical conversion steps of a color conversion process.

In the color conversion process illustrated in FIG. 7, colors in an RGB format color space are input. In office devices such as MFPs, colors in a CMYK format color space may be occasionally input, but generally colors in an RGB format color space are input.

Step S161 is a forward device model (F-DM) conversion step. More specifically, the F-DM conversion step is a step of converting an RGB format color space (RGB format data) to a CIE-XYZ space. In a case where an sRGB color space is used as the RGB format color space, for example, conversion (sRGB to XYZ conversion) can be performed in accordance with the sRGB definition.

Step S162 is a color appearance model (F-CAM) conversion step. For example, the F-CAM conversion step is a step of converting the CIE-XYZ space to a CIE-CAM02 space. For converting the CIE-XYZ space to a CIE-CAM02 space, conversion (XYZ to JCH conversion) is performed in view of environmental conditions and in accordance with the CIE-CAM02 definition.

Step S163 is a gamut mapping algorithm (GMA) conversion step. The GMA conversion step is a step of performing "JCH to J'C'H' conversion". Various GMA conversion methods have been offered by many companies and researchers. The GMA conversion can be performed by selecting and employing a suitable method from among such available methods in view of objectives and conditions or preference and properties of the output device.

Step S164 is a black ink amount determining step. The black ink amount determining process is a step of performing "J'C'H' to J'C'H'+K conversion". The black ink amount is predefined for expected values of JCH values GMA-converted in Step S163 (J'C'H' values). The black ink amount for actual GMA-converted JCH values are determined by computation. Various black ink amount determination methods have been also offered by many companies and researchers. A suitable method can be selected and employed from among such available methods in view of objectives and conditions or preference and properties of the output device.

Step S165 is a backward (B)-CAM conversion step. The B-CAM conversion step is a step of performing "J'C'H'+K to XYZ+K conversion". For converting "J'C'H'+K" to "XYZ+K", parameters are set depending on an environment in which output is performed or an environment in which observation of output results is performed. More specifically, the conversion can be performed in accordance with the color appearance model definition.

Note that Step S165 may be performed before Step S164.

Step S166 is a backward device model (B-DM) conversion step. The B-DM conversion step is a step of performing "XYZ+K to CMY+K conversion". As a result of the B-DM conversion, device-independent values (XYZ) are converted back to output device values.

A LUT referred to as a "BK-stratified K-XYZ to K-CMY LUT" is used in Step S166. This LUT is for example created as described below. That is, each of CMYK channels is divided for example by m to print m×m×m×m color patches using the MFP 20, and then colors of the printed color patches are measured. Next, "K-CMY to XYZ conversion data" stratified based on K values is obtained by referring to measured values (values of colors that are measured). Subsequently, inverse calculation is performed on the "K-CMY to XYZ conversion data" stratified based on K values. As a result, the "BK-stratified K-XYZ to K-CMY LUT" is created.

In the color conversion process illustrated in FIG. 7, colors in a CMYK format color space are output.

Figure 8:
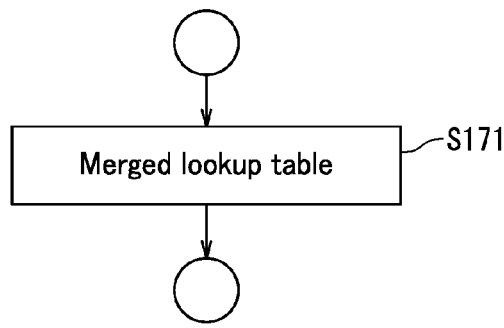
FIG. 8 is a flowchart of a single step obtained by merging the conversion steps illustrated in FIG. 7.

Note that the conversion steps in the LUT process are not limited to the conversion steps illustrated in FIG. 7. The LUT process may include a conversion step obtained by merging some of Steps S161 to S166 illustrated in FIG. 7. Alternatively, the LUT process may include a plurality of conversion steps obtained by dividing any one of Steps S161 to S166. Alternatively, the LUT process may be a single-step LUT process (Step S171) illustrated in FIG. 8 obtained by merging all Steps S161 to S166. The LUT process illustrated in FIG. 8 enables conversion from an RGB format color space to a CMYK format color space in one step.

The following describes a method for generating the color conversion process illustrated in FIG. 7.

Figure 9:
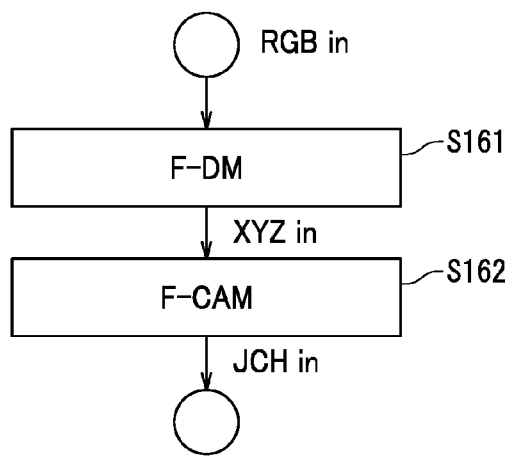
FIG. 9 is a flowchart of a color conversion process of outputting an "input device color space JCH in" to be used for generating the conversion steps illustrated in FIG. 7.

A color conversion process illustrated in FIG. 9 is performed to output an "input device color space JCH in"

through the same steps as Steps S161 and S162 in the color conversion process illustrated in FIG. 7.

Figure 10:
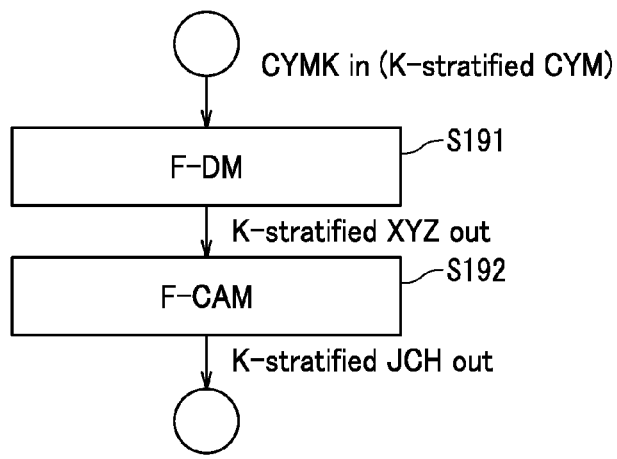
FIG. 10 is a flowchart of a color conversion process of outputting an "output device color space JCH out" to be used for generating the conversion steps illustrate in FIG. 7.

A color conversion process illustrated in FIG. 10 is performed to output an "output device color space JCH out". More specifically, first, color patches of various predetermined color values in CMYK values are printed using the MFP 20, and subsequently colors of the printed color patches are measured, and the measured values (values of colors that are measured) are converted to XYZ values in Step S191. As the color patches, color patches of CMYK values at predetermined intervals may be used.

Alternatively, color patches of randomized CMYK values may be used as the color patches. Alternatively, color patches of CMYK values at discrete intervals determined such that stratification can be performed based on Bk values may be used as the color patches. Next, in Step S192, the XYZ values obtained in Step S191 are converted to lightness information, chroma information, and hue information in accordance with a color appearance model consistent with environmental conditions. As a result, the "output device color space JCH out" is output.

Next, the "input device color space JCH in" obtained via the color conversion process illustrated in FIG. 9 and the "output device color space JCH out" obtained via the color conversion process illustrated in FIG. 10 are compared with one another to set correspondence points thereof. Next, a LUT that is used for conversion from the "input device color space JCH in" to the "output device color space JCH out" (LUT that is used in Step S163 in FIG. 7) is created by referring to the thus set correspondence points. Furthermore, a LUT that is used to set Bk values for reproducing the set correspondence points (LUT that is used in Step S164 in FIG. 7) is created.

Generally, the "input device color space JCH in" and "the output device color space JCH out" are different in size and shape. Therefore, many methods (gamut mapping algorithms: GMA) have been proposed as to how to associate respective points in an input device color space with points in an output device color space. In order to associate the respective points in the input device color space with the points in the output device color space (as a GMA conversion method to be employed in Step S163 in FIG. 7), therefore, a suitable method can be selected and employed from among the many proposed methods in view of objectives, intended use, or conditions.

Likewise, various methods have been proposed as the black ink amount determining method to be employed in Step S164 in FIG. 7; a suitable method can be selected and employed from among such available methods in view of objectives, intended use, or conditions.

The flowchart illustrated in FIG. 7 starts from input and ends with output through the color conversion process illustrated in FIG. 9 (Step S161 and Step S162), the GMA conversion method determined as described above (Step S163), the black ink amount determining method determined as described above (Step S164), and the reverse conversion LUT process (Step S165 and Step S166) using the inverse calculation (reverse search) in the color conversion process illustrated in FIG. 10.

Subsequent to completion of Step S102, as illustrated in FIG. 3, the controller 15 divides an entire pre-color conversion color gamut based on the color conversion table 14a into a group of tetrahedrons (Step S103).

In Step S103, each tetrahedron of the group of tetrahedrons is formed from four neighboring lattice points among the group of lattice points. Preferably, a set of tetrahedrons are generated such that a sphere circumscribing each tetrahedron formed from selected four lattice points does not include any other lattice points. For example, a group of tetrahedrons generated in Step S103 are a group of tetrahedrons in a three-dimensional Delaunay mesh. The three-dimensional Delaunay mesh can be created by employing an appropriate method from among known methods. That is, the group of tetrahedrons can be obtained by performing a Delaunay triangulation in a three-dimensional space based on the idea of performing a Delaunay triangulation on a two-dimensional plane.

Figure 11:
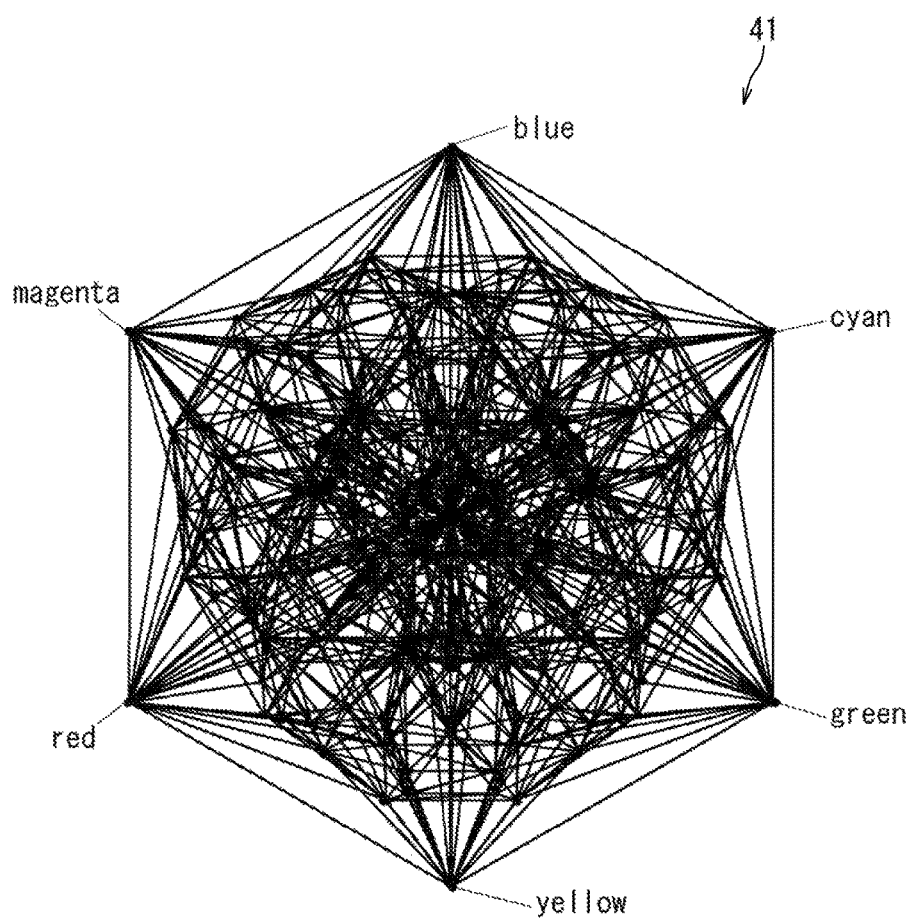
FIG. 11 is a perspective view of a group of tetrahedrons observed from the same observing point as that in FIG. 5B.

For example, a group of tetrahedrons 41 illustrated in FIG. 11 are obtained by plotting a group of tetrahedrons for the group of lattice points 31 illustrated in FIGS. 5A and 5B. FIG. 11 is a perspective view of the group of tetrahedrons 41 observed from the same observing point as that in FIG. 5B.

Figure 12:
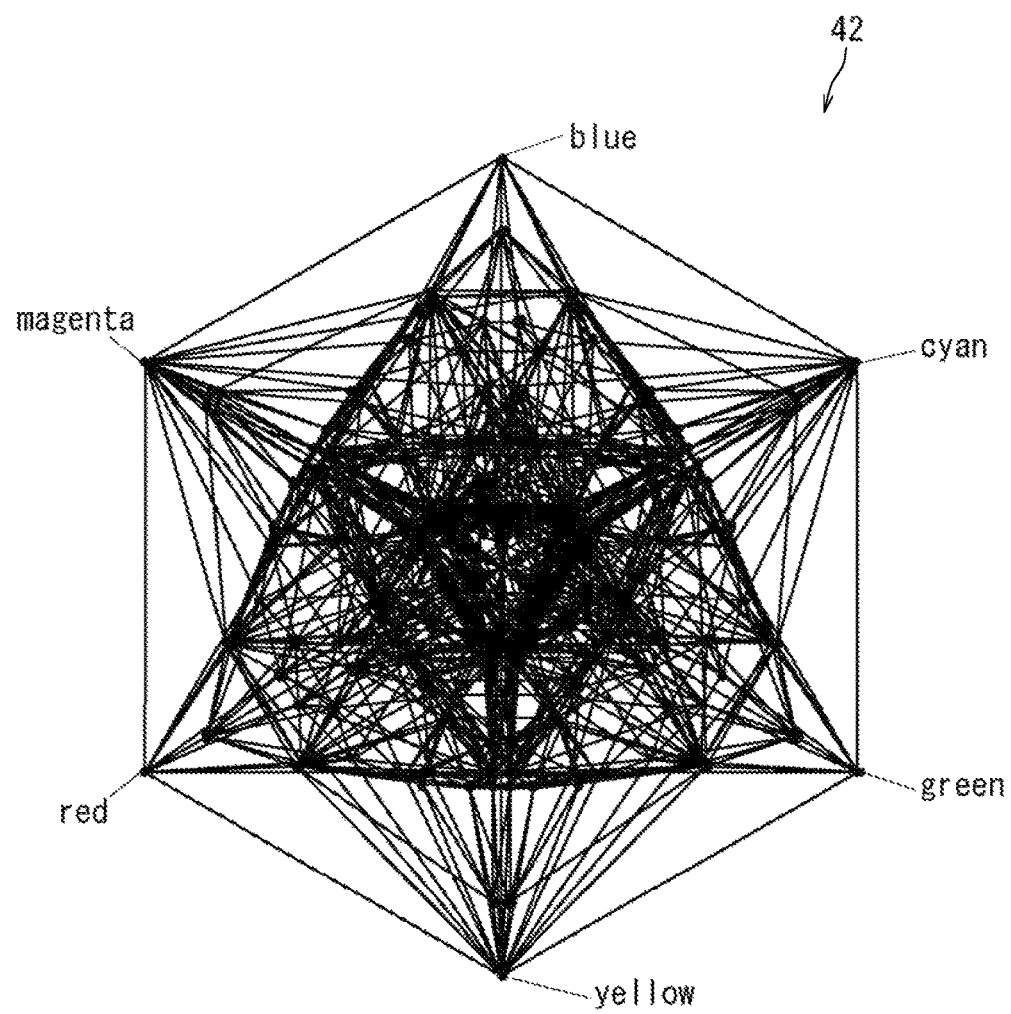
FIG. 12 is a perspective view of a group of tetrahedrons observed from the same observing point as that in FIG. 6B.

Furthermore, a group of tetrahedrons 42 illustrated in FIG. 12 are obtained by plotting a group of tetrahedrons for the group of lattice points 32 illustrated in FIGS. 6A and 6B. FIG. 12 is a perspective view of the group of tetrahedrons 42 observed from the same observing point as that in FIG. 6B.

Coordinates of points forming tetrahedrons (vertices of tetrahedrons) of the group of tetrahedrons generated in Step S103 are for example represented by an expression shown below.

$$\{\{\{\frac{27}{32}, \frac{1}{27}, \frac{1}{81}\}, \{\frac{27}{32}, \frac{1}{81}, \frac{1}{27}\}, \{\frac{9}{16}, \frac{1}{27}, \frac{1}{81}\}, \{1, 0, 0\}\},$$

$$\{\{\frac{47}{81}, \frac{23}{27}, \frac{29}{32}\}, \{1, 1, 1\}, \{\frac{17}{32}, \frac{73}{81}, \frac{25}{27}\}, \{\frac{37}{81}, \frac{13}{27}, \frac{31}{32}\}\},$$

$$\{\{\frac{64}{81}, \frac{16}{27}, \frac{1}{32}\}, \{\frac{25}{32}, \frac{11}{27}, \frac{11}{81}\}, \{\frac{15}{16}, \frac{55}{81}, \frac{7}{27}\}, \{\frac{13}{16}, \frac{19}{27}, \frac{19}{81}\}\},$$

$$\{\{\frac{64}{81}, \frac{1}{64}, \frac{16}{27}\}, \{\frac{25}{32}, \frac{11}{81}, \frac{11}{27}\}, \{\frac{56}{81}, \frac{3}{32}, \frac{8}{27}\}, \{\frac{21}{32}, \frac{5}{27}, \frac{29}{81}\}\},$$

$$\{\{\frac{7}{5}, \frac{5}{8}, \frac{5}{9}\}, \{\frac{11}{16}, \frac{13}{27}, \frac{37}{81}\}, \{\frac{7}{9}, \frac{5}{9}, \frac{5}{8}\}, \{\frac{5}{8}, \frac{7}{9}, \frac{5}{9}\}\} \ldots\}$$

Subsequent to completion of Step S103, as illustrated in FIG. 3, the controller 15 generates the color conversion table 14a (Step S104) and ends the operation illustrated in FIG. 3. The color conversion table 14a generated in Step S104 contains the groups of lattice points generated in the lattice point group generating process in Step S101, the output values calculated in Step S102, and the group of tetrahedrons obtained in Step S103.

The color conversion table 14a generated in the operation illustrated in FIG. 3 is for example read out from the color conversion table generating device 10 and stored as the color conversion table 27a in the MFP 20 by performing communication via a network.

Note that the color conversion table 14a generated by the color conversion table generating device 10 may not contain the group of tetrahedrons. In a case where the color conversion table 14a generated by the color conversion table generating device 10 does not contain the group of tetrahedrons, the MFP 20 may generate a group of tetrahedrons in the same manner as in Step S103 based on the group of lattice points contained in the color conversion table 14a.

The following describes an operation of the MFP 20.

Figure 13:
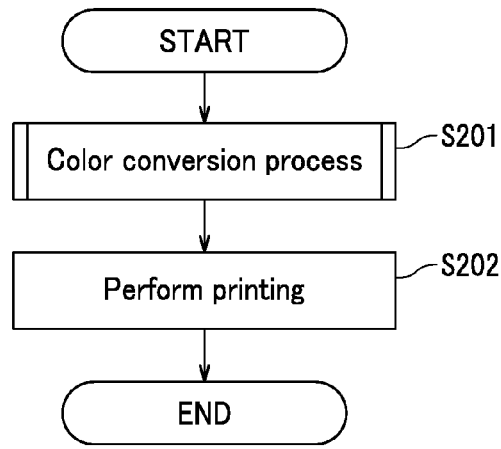
FIG. 13 is a flowchart of an operation of the MFP according to the first embodiment.

FIG. 13 is a flowchart of an operation of the MFP 20 according to the first embodiment. More specifically, FIG. 13 illustrates an operation of the MFP 20 for performing printing.

As illustrated in FIG. 13, the controller 28 of the MFP 20 performs a color conversion process (Step S201). More specifically, the color conversion process in Step S201 is a process of converting an input image in an RGB format to an output image in a CMYK format supported by the printer 24 serving as the output device.

Figure 14:
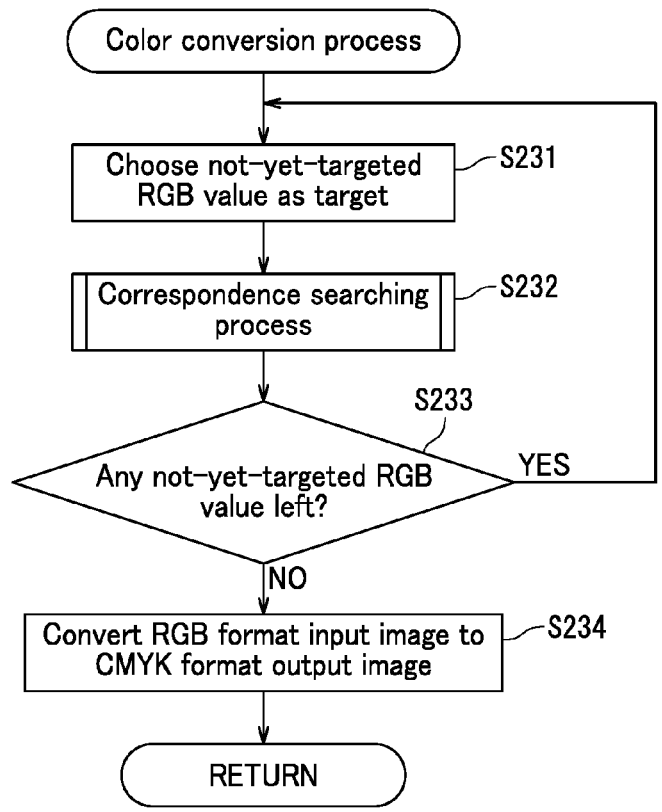
FIG. 14 is a flowchart of a color conversion process illustrated in FIG. 13.

FIG. 14 is a flowchart of the color conversion process illustrated in FIG. 13.

As illustrated in FIG. 14, the controller 28 chooses a not-yet-targeted RGB value as a target from among the color values (RGB values) forming the RGB format input image (Step S231).

Next, the controller 28 performs a correspondence searching process (Step S232). More specifically, the correspondence searching process is a process of searching for a correspondence between the target RGB value chosen in Step S231 and a CMYK value.

Figure 15:
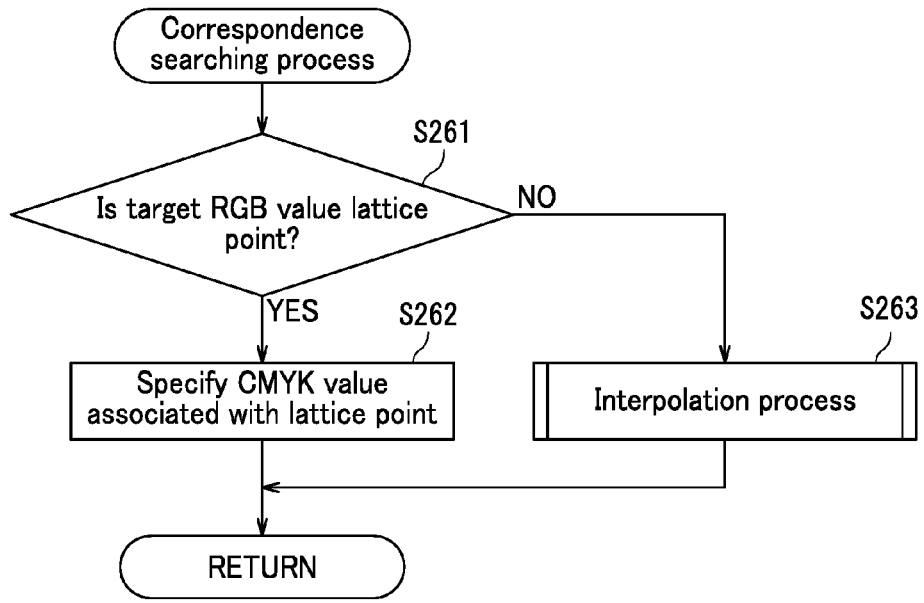
FIG. 15 is a flowchart of a correspondence searching process illustrated in FIG. 14.

FIG. 15 is a flowchart of the correspondence searching process illustrated in FIG. 14.

As illustrated in FIG. 15, the controller 28 determines whether or not the target RGB value is a pre-color conversion lattice point in the color conversion table 27a (Step S261).

When determining that the target RGB value is a pre-color conversion lattice point in the color conversion table 27a (YES in step S261), the controller 28 specifies, as a CMYK value corresponding to the target RGB value, a conversion value (CMYK value) associated with the lattice point corresponding to the target RGB value among the pre-color conversion lattice points in the color conversion table 27a (Step S262). After specifying the CMYK value corresponding to the target RGB value, the controller 28 ends the correspondence searching process illustrated in FIG. 15.

When determining that the target RGB value is not a pre-color conversion lattice point in the color conversion table 27a, that is, the target RGB value is a point located in between lattice points (NO in Step S261), the controller 28 performs an interpolation process of calculating a conversion value (CMYK value) corresponding to the target RGB value (Step S263). More specifically, the interpolation process in Step S263 is a process of converting the target RGB value to a CMYK value.

Figure 16:
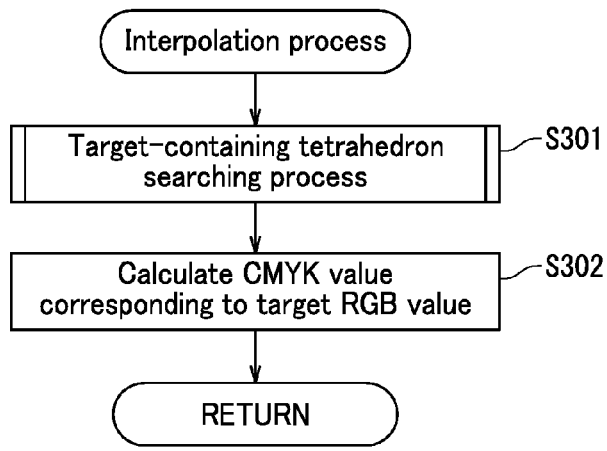
FIG. 16 is a flowchart of an interpolation process illustrated in FIG. 15.

FIG. 16 is a flowchart of the interpolation process illustrated in FIG. 15.

As illustrated in FIG. 16, the controller 28 performs a target-containing tetrahedron searching process (Step S301). More specifically, the target-containing tetrahedron searching process is a process of searching the group of tetrahedrons contained in the color conversion table 27a for a tetrahedron containing the target RGB value.

Figure 17:
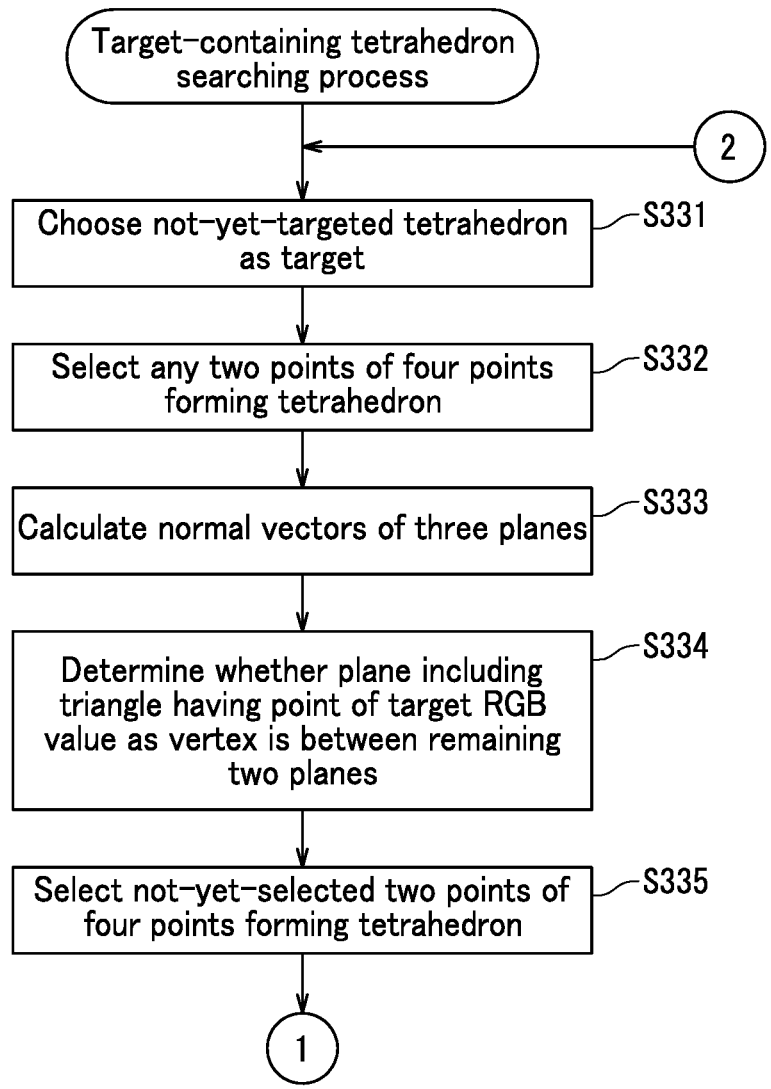
FIGS. 17 and 18 are a flowchart of a target-containing tetrahedron searching process illustrated in FIG. 16.
Figure 18:
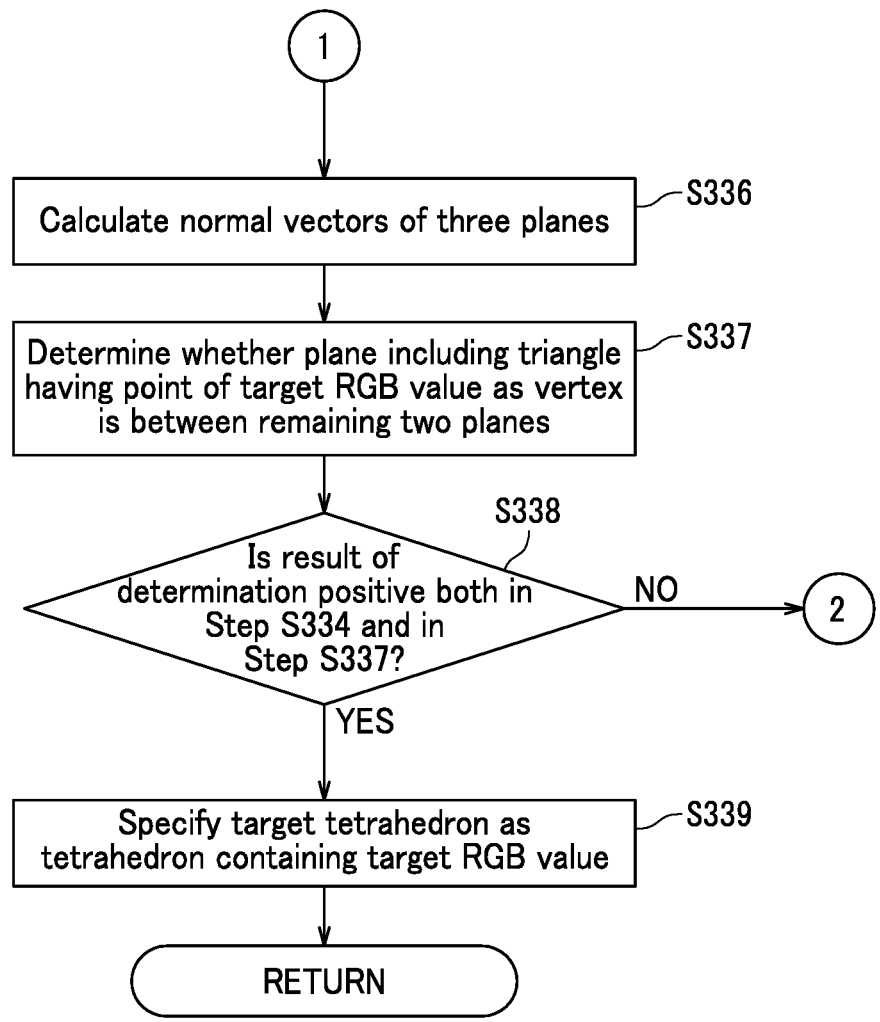

FIGS. 17 and 18 are a flowchart of the target-containing tetrahedron searching process illustrated in FIG. 16.

As illustrated in FIG. 17, the controller 28 chooses a not-yet-targeted tetrahedron as a target from among the group of tetrahedrons contained in the color conversion table 27a (Step S331).

Next, the controller 28 selects any two points (for example, points A and B) of the four points (for example, points A, B, C, and D) forming the target tetrahedron (Step S332).

Next, the controller 28 calculates normal vectors of three planes respectively including three triangles each having, as a base thereof, a line segment connecting the two points (points A and B) selected in Step S332 (Step S333). More specifically, the controller 28 calculates a normal vector of a plane including a triangle having, as a vertex thereof, a point represented by the target RGB value (for example, point X). Furthermore, the controller 28 calculates a normal vector of a plane including a triangle having, as a vertex thereof, a point (for example, point C) other than the two points (points A and B) selected from among the four points forming the target tetrahedron in Step S332. Furthermore, the controller 28 calculates a normal vector of a plane including a triangle having, as a vertex thereof, a remaining one point (for example, point D) of the points other than the two points (points A and B) selected from among the four points forming the target tetrahedron in Step S332. A normal vector of a plane including a triangle can be calculated by calculating a cross product of two vectors having one point of the three points forming the plane (for example, three vertices of the triangle) as a starting point and the remaining two points as ending points.

Next, the controller 28 refers to the three normal vectors calculated in Step S333 to determine angles of the normal vectors of the three planes relative to a normal vector of a specific reference plane. In other words, the controller 28 determines angles of the three planes relative to the reference plane. The controller 28 then determines whether or not the angle of the plane including the triangle having, as a vertex thereof, the point represented by the target RGB value is between the angles of the remaining two planes (Step S334).

Next, the controller 28 selects the two points (points C and D) that were not selected in Step S332 from among the four points (points A, B, C, and D) forming the target tetrahedron (Step S335).

Next, as illustrated in FIG. 18, the controller 28 calculates normal vectors of three planes respectively including three triangles each having, as a base thereof, a line segment connecting the two points (points C and D) selected in Step S335 (Step S336). More specifically, the controller 28 calculates a normal vector of a plane including a triangle having, as a vertex thereof, the point represented by the target RGB value (point X). Furthermore, the controller 28 calculates a normal vector of a plane including a triangle having, as a vertex thereof, a point (for example, point A) other than the two points (points C and D) selected from among the four points forming the target tetrahedron in Step S335. Furthermore, the controller 28 calculates a normal vector of a plane including a triangle having, as a vertex thereof, a remaining one point (for example, point B) of the points other than the two points (points C and D) selected from among the four points forming the target tetrahedron in Step S335.

Next, the controller 28 refers to the three normal vectors calculated in Step S336 to determine angles of the three normal vectors relative to a normal vector of a specific reference plane. In other words, the controller 28 determines angles of the three planes relative to the reference plane. The controller 28 then determines whether or not the angle of the plane including the triangle having, as a vertex thereof, the point represented by the target RGB value is between the angles of the remaining two planes (Step S337).

Next, the controller 28 determines whether or not the result of the determination of whether or not the angle of the plane including the triangle having, as a vertex thereof, the point represented by the target RGB value is between the angles of the remaining two planes is positive both in Step S334 and in Step S337 (Step S338).

When determining that the result of the determination of whether or not the angle of the plane including the triangle having, as a vertex thereof, the point represented by the target RGB value is between the angles of the remaining two planes is negative in at least one of Step S334 and Step S337 (NO in Step S338), the controller 28 performs Step S331.

When determining that the result of the determination of whether or not the angle of the plane including the triangle having, as a vertex thereof, the point represented by the target RGB value is between the angles of the remaining two planes is positive both in Step S334 and in Step S337 (YES in Step S338), the controller 28 specifies the target tetrahedron chosen in Step S331 as a tetrahedron containing the target RGB value (Step S339). Once a tetrahedron containing the target RGB value is specified, the target-containing tetrahedron searching process illustrated in FIGS. 17 and 18 comes to an end.

The method for searching for a tetrahedron containing the target RGB value is not limited to the searching method based on angles of three planes relative to a reference plane. For example, the controller 28 may search for a tetrahedron containing the target RGB value based on angles between three planes (angles between three normal vectors). More specifically, the controller 28 may determine whether or not the plane including the triangle having, as a vertex thereof, the point represented by the target RGB value is between the remaining two planes based on the angles between the three planes (angles between three normal vectors). Alternatively, the controller 28 may determine, with respect to each of the four planes (triangular faces) forming the target tetrahedron, whether or not the point represented by the target RGB value is located further in from the plane (located inside the tetrahedron). More specifically, a scalar triple product is calculated. That is, the controller 28 calculates a dot product of a cross product (normal vector) of two vectors having one point of the three points forming the triangular face as a starting point and the remaining two points as ending points with a vector having the one point as a starting point and the point represented by the target RGB value as an ending point. Based on a result of the calculation, the orientation of the point represented by the target RGB value with respect to the triangular face can be determined. The tetrahedron can be specified as the tetrahedron containing the target RGB value on the condition that the point represented by the target RGB value is located further in from each of the planes (triangular faces) forming the tetrahedron (located inside the tetrahedron).

Subsequent to the target-containing tetrahedron searching process in Step S301, as illustrated in FIG. 16, the controller 28 calculates a conversion value (CMYK value) corresponding to the target RGB value (Step S302). More specifically, the tetrahedron found in Step S301 is divided into a plurality of three-dimensional components based on the point represented by the target RGB value. The controller 28 then calculates a conversion value (CMYK value) corresponding to the target RGB value based on the volume ratio of the three-dimensional components.

The controller 28 for example divides the tetrahedron found in Step S301 (for example, a tetrahedron formed from points E, F, G, and H) into four tetrahedrons based on the target RGB value. More specifically, each of the four tetrahedrons is a triangular pyramid. The four tetrahedrons respectively have the four triangular faces (triangular faces FGH, EGH, EFH, and EFG) forming the tetrahedron found in Step S301 as bases thereof. Furthermore, the four tetrahedrons have the point (point X) represented by the target RGB value as a vertex thereof. That is, the tetrahedron found in Step S301 is divided into tetrahedrons X-FGH, X-EGH, X-EFH, and X-EFG. Suppose volumes of the tetrahedrons X-FGH, X-EGH, X-EFH, and X-EFG are Ve, Vf, Vg, and Vh, respectively, and a sum of the volumes, that is, a volume of the tetrahedron EFGH is Vs. Then the controller 28 can calculate a conversion value (CMYK value) corresponding to the target RGB value in accordance with an equation shown below. Note that in the equation shown below, Xcmyk represents the conversion value (CMYK value) corresponding to the target RGB value. Ecmyk, Fcmyk, Gcmyk, and Hcmyk represent conversion values (CMYK values) corresponding to point E, point F, point G, and point H, respectively.

$$Xcmyk = \left\{\frac{Ve}{Vs}, \frac{Vf}{Vs}, \frac{Vg}{Vs}, \frac{Vh}{Vs}\right\} \cdot \{Ecmyk, Fcmyk, Gcmyk, Hcmyk\}$$

Ve, Vf, Vg, Vh may for example be respectively determined in accordance with equations shown below.

$$V_e = \frac{1}{6}|det(\vec{XF}, \vec{XG}, \vec{XH})|$$

$$V_f = \frac{1}{6}|det(\vec{XE}, \vec{XG}, \vec{XH})|$$

$$V_g = \frac{1}{6}|det(\vec{XE}, \vec{XF}, \vec{XH})|$$

$$V_h = \frac{1}{6}|det(\vec{XE}, \vec{XF}, \vec{XG})|$$

Furthermore, Vs may be a sum of Ve, Vf, Vg, and Vh or may be for example determined in accordance with an equation shown below.

$$V_s = \frac{1}{6}|det(\vec{EF}, \vec{EG}, \vec{EH})|$$

Subsequent to Step S302, as illustrated in FIG. 16, the controller 28 ends the interpolation process illustrated in FIG. 16.

Although the interpolation process illustrated in FIG. 16 is performed by tetrahedral interpolation in the present embodiment, the interpolation process may be performed by any interpolation other than tetrahedral interpolation. For example, the interpolation process may be performed by hexahedral interpolation or triangular prismatic interpolation.

Subsequent to the interpolation process in Step S263, as illustrated in FIG. 15, the controller 28 ends the correspondence searching process illustrated in FIG. 15.

Subsequent to the correspondence searching process in Step S232, as illustrated in FIG. 14, the controller 28 determines whether or not there is any not-yet-targeted RGB value left among the RGB values forming the RGB format input image (Step S233).

When determining that there is a not-yet-targeted RGB value left among the RGB values forming the RGB format input image (YES in Step S233), the controller 28 performs Step S231.

When determining that there is no not-yet-targeted RGB value left among the RGB values forming the RGB format input image (NO in Step S233), the controller 28 converts the RGB format input image to a CMYK format output image based on the correspondences between the RGB values and the CMYK values found in the correspondence searching process in Step S232 (Step S234). After the RGB format input image is converted to a CMYK format output image, the color conversion process illustrated in FIG. 14 comes to an end.

Subsequent to the color conversion process in Step S201, as illustrated in FIG. 13, the controller 28 causes the printer 24 to perform printing on a recording medium based on the CMYK format output image generated in Step S201 (Step S202). After printing is performed, the operation illustrated in FIG. 13 comes to an end.

The first embodiment has been described above. The color conversion table generating device 10 according to the first embodiment generates a group of pre-color conversion lattice points to be contained in the color conversion table 14a using van der Corput sequences without putting the lattice points in a cubic lattice arrangement (FIG. 4). Thus, such a configuration can increase the number of lattice points under a condition of a limited capacity of memory available to store lattice point information compared to a configuration in which a group of pre-color conversion lattice points to be contained in a color conversion table are put in a cubic lattice arrangement. The color conversion table generating device 10 can therefore improve the accuracy of the quality of images to be output via the color conversion table 14a.

Figure 22:
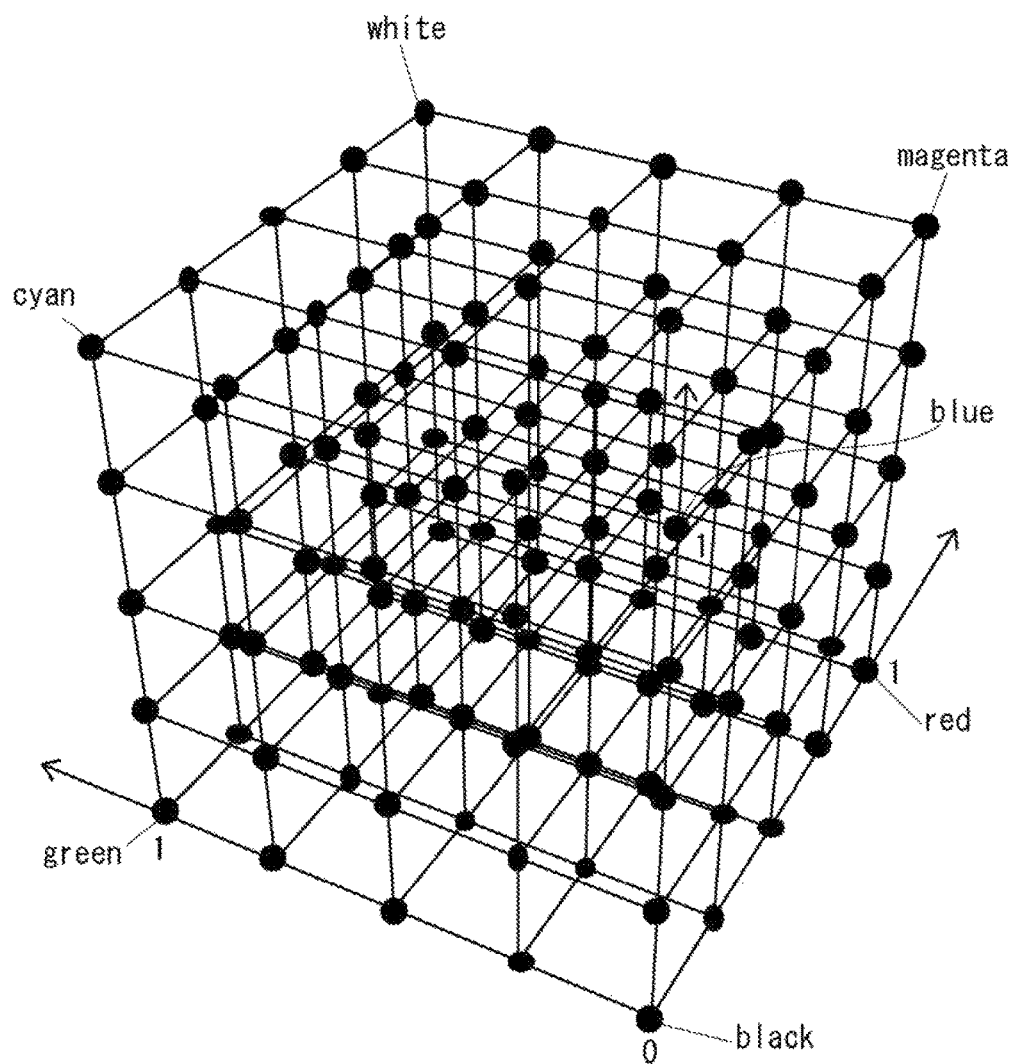
FIG. 22 is a diagram illustrating a typical color conversion table.

Description is now given of a color conversion table in which a group of pre-color conversion lattice points are in a cubic lattice arrangement (see FIG. 22). An RGB color space and a CMYK color space are different in color gamut shape. A relationship between these color spaces is typically non-linear. For calculating intermediate data located in between lattice points in the color conversion table by linear interpolation, therefore, the greater the number of lattice points, the smaller the difference between actual intermediate data and intermediate data calculated by interpolation. The reason for the above is that the greater the number of lattice points, the smaller the distance between lattice points. Accordingly, the greater the number of lattice points in a color conversion table, the higher the accuracy of the quality of images to be output by the image forming apparatus.

The upper limit of the capacity of memory available to store lattice point information is determined depending on allowable component costs for the image forming apparatus. The upper limit of the number (maximum number Smax) of lattice points to be contained in the color conversion table is determined depending on the upper limit of the capacity of the memory available to store lattice point information. The number of lattice points necessary for a color conversion table in which pre-color conversion lattice points are in a cubic lattice arrangement is "the cube of N", wherein the number of lattice points per edge of the cubic lattice is N. However, "the cube of N" seldom agrees with the maximum number Smax. The upper limit Nmax of the number N of lattice points per edge of the cubic lattice is therefore set to an integer that is not greater than the cube root of the maximum number Smax as represented by an equation shown below.

$N\text{max}=\text{FLOOR}[(S\text{max})^{1/3}]$

In a case where the maximum number Smax is 1,200 due to component cost constraints, for example, the upper limit Nmax of the number N of lattice points per edge of the cubic lattice is 10 as shown by the equation.

$N\text{max}=\text{FLOOR}[(1200)^{1/3}]=10$

The upper limit of the number of lattice points in the color conversion table in which pre-color conversion lattice points are in a cubic lattice arrangement is "the cube of Nmax". In a case where the Nmax is 10, therefore, the upper limit of the number of lattice points in the color conversion table in which pre-color conversion lattice points are in a cubic lattice arrangement is 1,000 (the cube of 10).

That is, part of the capacity of the memory storing lattice point information that corresponds to 1200−1000=200 lattice points will be left unused. In a case where the color conversion table in which pre-color conversion lattice points are in a cubic lattice arrangement is used, therefore, the accuracy of the quality of images to be output by the image forming apparatus is low compared to a configuration in which information of a maximum number of lattice points is stored in the memory available to store lattice point information.

As described above, in a case where pre-color conversion lattice points are in a cubic lattice arrangement, the accuracy of the quality of images to be output by the image forming apparatus may not be sufficient under a condition of limited image forming apparatus component costs (limited capacity of memory available to store lattice point information).

Returning to the description of the color conversion table generating device 10 according to the first embodiment, the color conversion table generating device 10 generates three van der Corput sequences each having a different basis. As a result, uniformity of the arrangement of lattice points each located at coordinates including terms in the same ordinal number out of the three respective van der Corput sequences can be improved. The color conversion table generating device 10 can therefore achieve more stable accuracy of the quality of images to be output via the color conversion table 14a.

The color conversion table generating device 10 may generate three van der Corput sequences at least two of which have the same basis. In a case where the color conversion table generating device 10 generates three van der Corput sequences at least two of which have the same basis, the sequences have reduced randomness, and resulting lattice points are likely to be in a crystalline structure-like arrangement compared to the case where the color conversion table generating device 10 generates three van der Corput sequences each having a different basis. However, even if the sequences have reduced randomness and the resulting lattice points are in a crystalline structure-like arrangement, the color conversion table generating device 10 can ensure uniformity of the lattice point arrangement by performing Steps S115 and S116 described with reference to FIG. 4. More specifically, the color conversion table generating device 10 arranges the group of lattice points symmetrically with respect to each of the six base hues by interchanging the channel information of the coordinates of the lattice points (Step S115). Furthermore, the color conversion table generating device 10 also generates a group of lattice points of colors complementary to those of the group of lattice points generated in Step S115 (Step S116). As a result, uniformity of the lattice point arrangement is ensured.

The color conversion table generating device 10 generates lattice points corresponding to eight vertices of a pre-color conversion color space (Step S117 in FIG. 4). In a case where intermediate data located in between lattice points in the color conversion table 14a is calculated by interpolation, therefore, it is possible to improve the accuracy of calculation of intermediate data located in between lattice points in the vicinity of any of the vertices of the pre-color conversion color space.

Second Embodiment

The following describes a second embodiment of the present disclosure with reference to FIGS. 1, 19, 20A, 20B, 21A, and 21B. However, description of matter that is described in the first embodiment is omitted, and differences compared to the first embodiment are described. The second embodiment is different from the first embodiment in the lattice point group generating process.

As illustrated in FIG. 1, the controller 15 in the color conversion table generating device 10 according to the second embodiment functions as the sequence generating section 15a and the lattice point generating section 15b by executing the lattice point group generation program 14b stored in the storage device 14. The sequence generating section 15a (controller 15) generates three van der Corput sequences in which the number of terms is equal to a quotient obtained by subtracting a specified number from the maximum number of lattice points allocatable to the color conversion table 14a and dividing the difference by 6, and whose basis is a positive integer greater than or equal to 2. The lattice point generating section 15b (controller 15) associates the three van der Corput sequences generated by the sequence generating section 15a with three channels of an RGB color space in one-to-one correspondence. The lattice point generating section 15b (controller 15) generates lattice points each located at coordinates including terms in the same ordinal number out of the three respective van der Corput sequences for six possible associations of the three van der Corput sequences with the three channels of the RGB color space.

Figure 19:
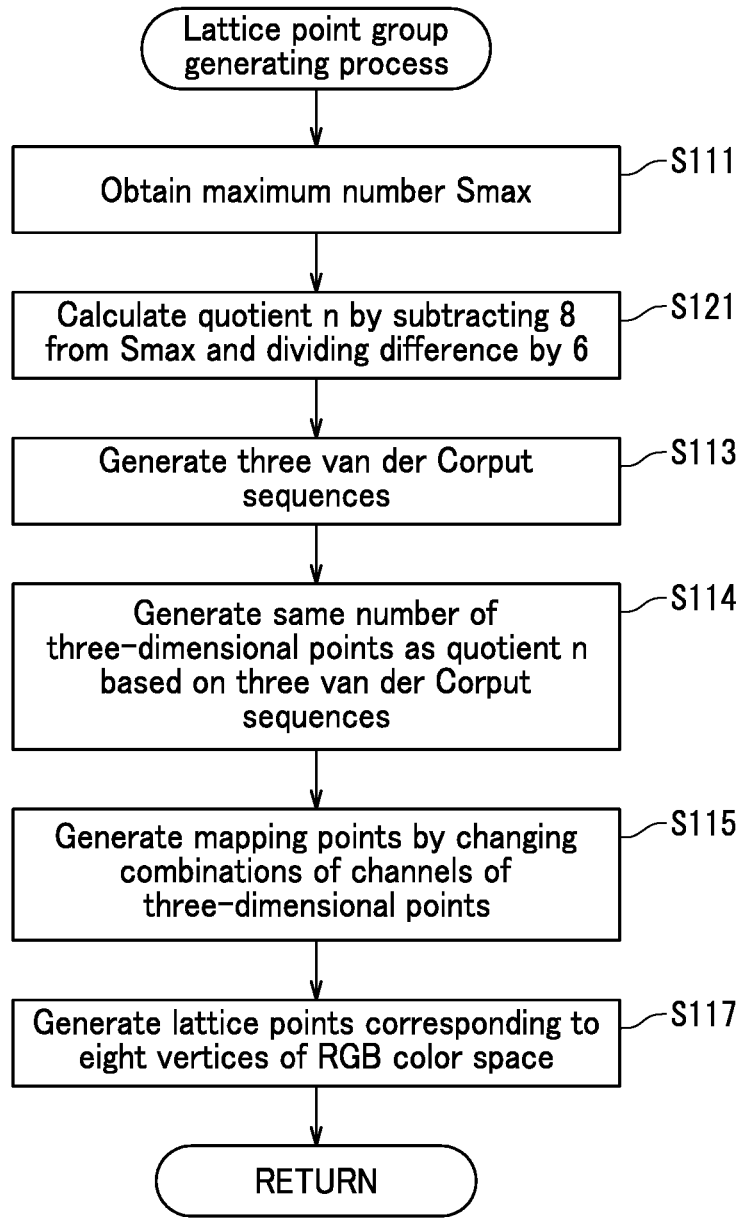
FIG. 19 is a flowchart of a lattice point group generating process according to a second embodiment of the present disclosure.

FIG. 19 is a flowchart of the lattice point group generating process according to the second embodiment.

As illustrated in FIG. 19, the sequence generating section 15a obtains the maximum number Smax of lattice points allocatable to the color conversion table 14a for the storage device 27 of the MFP 20 as in the first embodiment (Step S111).

Next, the sequence generating section 15a calculates a quotient n by subtracting 8 from the maximum number Smax obtained in Step S111 and dividing the difference by 6 (Step S121).

$$n = \mathrm{FLOOR}\left[\frac{S\max - 8}{6}\right]$$

Thereafter, the lattice point generating section 15b generates groups of lattice points in the same manner as in the first embodiment (Steps S113 to S115 and S117). However, unlike the first embodiment (FIG. 4), the lattice point group generating process according to the second embodiment does not include Step S116 (process of generating a group of lattice points of complementary colors).

Figure 20A:
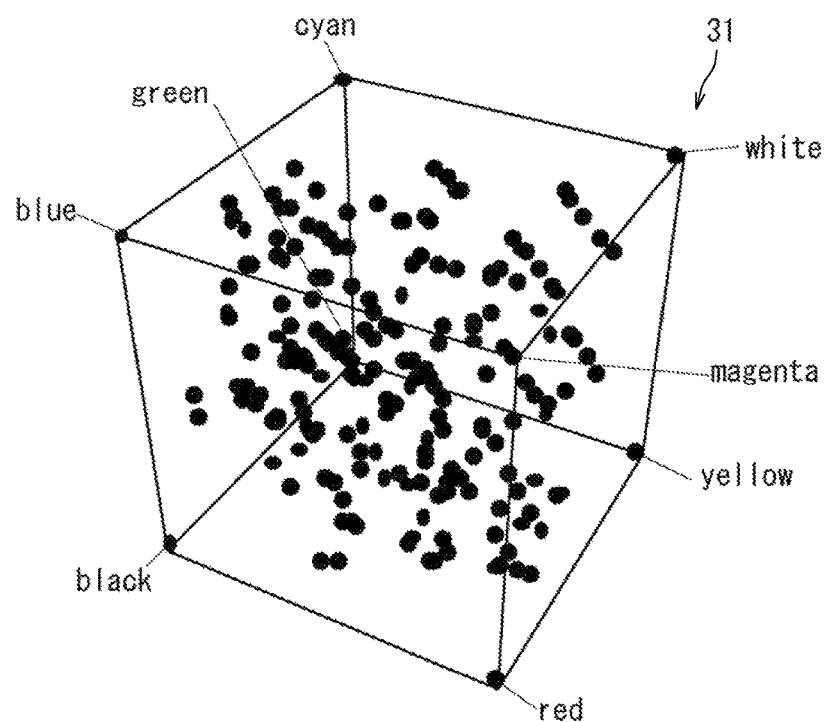
FIG. 20A is a perspective view of a group of lattice points generated by a color conversion table generating device according to the second embodiment in a case where three van der Corput sequences having a basis of 2, 3, and 5, respectively, are generated.
Figure 20B:
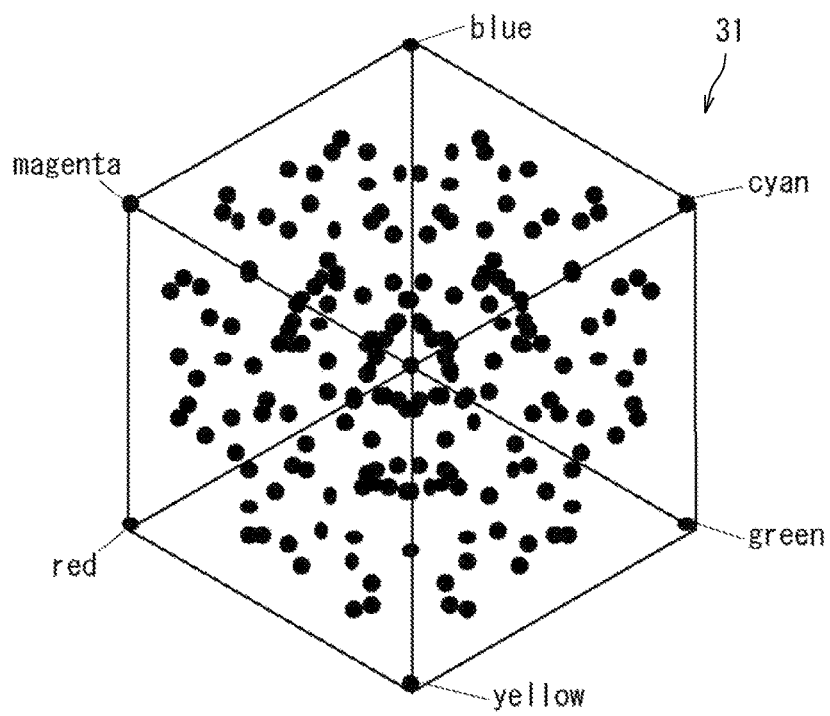
FIG. 20B is a perspective view of the group of lattice points illustrated in FIG. 20A observed in a direction from a white point toward a black point.

According to the second embodiment, the lattice point generating section 15b generates a group of lattice points illustrated in FIGS. 20A and 20B in Steps S115 and S117 in a case where the sequence generating section 15a generates three van der Corput sequences having a basis of 2, 3, and 5, respectively, in Step S113.

FIG. 20A is a perspective view of the group of lattice points 31 generated by the color conversion table generating device 10 according to the second embodiment in a case where the three van der Corput sequences having a basis of 2, 3, and 5, respectively, are generated. FIG. 20B is a perspective view of the group of lattice points 31 illustrated in FIG. 20A observed in a direction from a white point toward a black point.

As a result of interchanging the channel information of the coordinates of the lattice points in Step S115, the group of lattice points 31 are distributed symmetrically with respect to each of six base hues: red, green, blue, cyan, magenta, and yellow as illustrated in FIG. 20B.

As described in the first embodiment, the group of three-dimensional points that are generated in Step S114 are preferably Halton sequences. That is, it is preferable to generate three van der Corput sequences each having a basis being a prime in Step S113. However, the basis of each of the three van der Corput sequences that are generated in Step S113 may not be a prime. In a case where the basis of each of the three van der Corput sequences is not a prime, the sequences have reduced randomness, and the group of three-dimensional points (lattice points) to be generated in Step S14 are in a crystalline structure-like arrangement. However, according to the present embodiment, it is possible to ensure uniformity of the lattice point arrangement by performing Step S115 even if the sequences have reduced randomness and the resulting lattice points are in a crystalline structure-like arrangement. That is, the lattice point generating section 15b arranges the group of lattice points symmetrically with respect to each of the six base hues by interchanging the channel information of the coordinates of the lattice points. As a result, uniformity of the lattice point arrangement is ensured. In a case where three van der Corput sequences having a basis of 2, 3, and 9, respectively, are generated, for example, the color conversion table generating device 10 according to the second embodiment generates the group of lattice points 32 illustrated in FIGS. 21A and 21B.

Figure 21A:
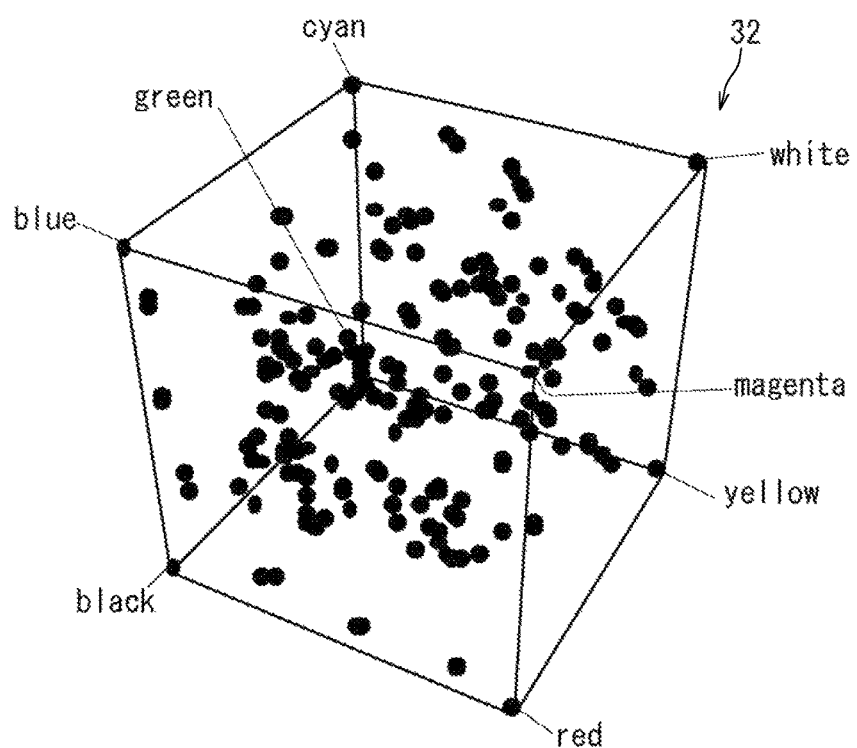
FIG. 21A is a perspective view of a group of lattice points generated by the color conversion table generating device according to the second embodiment in a case where three van der Corput sequences having a basis of 2, 3, and 9, respectively, are generated.
Figure 21B:
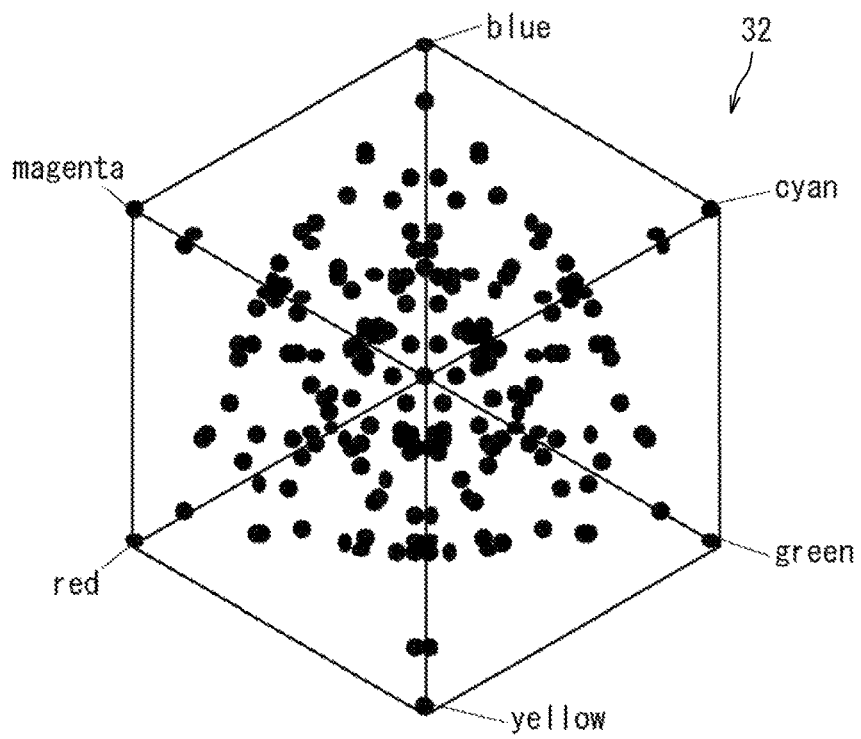
FIG. 21B is a perspective view of the group of lattice points illustrated in FIG. 21A observed in a direction from a white point toward a black point.

FIG. 21A is a perspective view of the group of lattice points 32 generated by the color conversion table generating device 10 according to the second embodiment in a case where three van der Corput sequences having a basis of 2, 3, and 9, respectively, are generated. FIG. 21B is a perspective view of the group of lattice points 32 illustrated in FIG. 21A observed in a direction from a white point toward a black point.

As a result of interchanging the channel information of the coordinates of the lattice points in Step S115, the group of lattice points 32 are distributed symmetrically with respect to each of six base hues: red, green, blue, cyan, magenta, and yellow as illustrated in FIG. 21B.

The second embodiment has been described above. The color conversion table generating device 10 according to the second embodiment generates a group of pre-color conversion lattice points to be contained in the color conversion table 14a using van der Corput sequences without putting the lattice points in a cubic lattice arrangement (FIG. 19). The color conversion table generating device 10 according to the second embodiment can therefore improve the accuracy of the quality of images to be output via the color conversion table 14a as in the first embodiment.

The color conversion table generating device 10 according to the second embodiment generates three van der Corput sequences each having a different basis. The color conversion table generating device 10 according to the second embodiment can therefore achieve stable accuracy of the quality of images to be output via the color conversion table 14a as in the first embodiment.

The color conversion table generating device 10 may generate three van der Corput sequences at least two of which have the same basis. In a case where the color conversion table generating device 10 generates three van der Corput sequences at least two of which have the same basis, the sequences have reduced randomness, and the lattice points to be generated are likely to be in a crystalline structure-like arrangement compared to the case where the color conversion table generating device 10 generates three van der Corput sequences each having a different basis. However, even if the sequences have reduced randomness and the resulting lattice points are in a crystalline structure-like arrangement, the color conversion table generating device 10 according to the second embodiment can ensure uniformity of the lattice point arrangement by performing Step S115 illustrated in FIG. 19. More specifically, the color conversion table generating device 10 according to the second embodiment arranges the group of lattice points symmetrically with respect to each of the six base hues by interchanging the channel information of the coordinates of the lattice points (Step S115). As a result, uniformity of the lattice point arrangement is ensured.

The color conversion table generating device 10 according to the second embodiment generates lattice points corresponding to eight vertices of a pre-color conversion color space (Step S117 in FIG. 19). In a case where intermediate data located in between lattice points in the color conversion table 14a is calculated by interpolation, therefore, the color conversion table generating device 10 according to the second embodiment can improve the accuracy of calculation of intermediate data located in between lattice points in the vicinity of any of the vertices of the pre-color conversion color space as in the first embodiment.

Through the above, embodiments of the present disclosure have been described with reference to the accompanying drawings. The present disclosure is not limited to the above-described embodiments and may be implemented in various different forms that do not deviate from the essence of the present disclosure. For example, although the image forming apparatus that uses the color conversion table generated by the color conversion table generating device 10 according to the embodiments of the present disclosure is an MFP, the image forming apparatus may be any non-MFP image forming apparatus such as a printer.

What is claimed is:

1. A system comprising:
an image forming apparatus; and
a lattice point group generating device for generating a group of pre-color conversion lattice points to be contained in a color conversion table used for conversion of colors in an RGB color space to colors in a CMYK color space in the image forming apparatus, wherein
the image forming apparatus includes:
a first storage device that includes semiconductor memory and a hard disk drive and that stores therein the color conversion table;
a first controller including a central processing unit, read only memory, and random access memory; and
a printer,
the first controller
(i) determines whether or not a target RGB value is a pre-color conversion lattice point in the color conversion table,
(ii) when determining that the target RGB value is the pre-color conversion lattice point in the color conversion table, specifies, as a CMYK value corresponding to the target RGB value, a conversion value associated with the lattice point corresponding to the target RGB value among the pre-color conversion lattice points in the color conversion table,
(iii) when determining that the target RGB value is not the pre-color conversion lattice point in the color conversion table and is a point located in between lattice points, performs an interpolation process to calculate the conversion value corresponding to the target RGB value, and
(iv) when determining that a conversion value has been specified for each RGB value forming an RGB format input image, converts the RGB format input image to a CMYK format output image on the basis of the specified conversion values and causes the printer to print on a recording medium based on the CMYK format output image, the lattice point group generating device includes:
a second storage device that includes a hard disk drive and that stores therein a lattice point group generation program; and
a second controller that includes a central processing unit, read only memory, and random access memory and that executes the lattice point group generation program to function as a sequence generating section and a lattice point generating section,
the sequence generating section
(i) obtains a maximum number Smax of lattice points allocatable to the color conversion table for the image forming apparatus, the maximum number Smax being determined depending on a capacity of the first storage device of the image forming apparatus,
(ii) calculates a quotient n using the following equation by dividing a difference by 12, the difference being obtained by subtracting 8 from the maximum number Smax, and $$n = \text{FLOOR}\left[\frac{Smax - 8}{12}\right]$$

(iii) generates three van der Corput sequences in which the number of terms is equal to the quotient n and whose basis is a positive integer greater than or equal to 2; and
the lattice point generating section
(i) performs nesting on the three van der Corput sequences,
(ii) performs a matrix transformation on a nested array to acquire an array having n rows and three columns to generate a group of three-dimensional points, the number of three-dimensional points being equal to the quotient n,
(iii) generates a group of mapping points by changing combinations of three channels of colors in the RGB color space of the three-dimensional points, the group of mapping points being part of a group of lattice points to be contained in the color conversion table,
(iv) generates a group of lattice points of complementary colors of the group of lattice points, the group of lattice points of complementary colors being part of the group of lattice points to be contained in the color conversion table, and
(v) generates eight lattice points corresponding to eight vertices of the RGB color space, the eight lattice points being part of the group of lattice points to be contained in the color conversion table.

2. A system comprising:
an image forming apparatus; and
a lattice point group generating device for generating a group of pre-color conversion lattice points to be contained in a color conversion table used for conversion of colors in an RGB color space to colors in a CMYK color space in the image forming apparatus, wherein
the image forming apparatus includes:
a first storage device that includes semiconductor memory and a hard disk drive and that stores therein the color conversion table;
a first controller including a central processing unit, read only memory, and random access memory; and
a printer,
the first controller (i) determines whether or not a target RGB value is a pre-color conversion lattice point in the color conversion table,
(ii) when determining that the target RGB value is the pre-color conversion lattice point in the color conversion table, specifies, as a CMYK value corresponding to the target RGB value, a conversion value associated with the lattice point corresponding to the target RGB value among the pre-color conversion lattice points in the color conversion table,
(iii) when determining that the target RGB value is not the pre-color conversion lattice point in the color conversion table and is a point located in between lattice points, performs an interpolation process to calculate the conversion value corresponding to the target RGB value, and
(iv) when determining that a conversion value has been specified for each RGB value forming an RGB format input image, converts the RGB format input image to a CMYK format output image on the basis of the specified conversion values and causes the printer to print on a recording medium based on the CMYK format output image, the lattice point group generating device includes:
a second storage device that includes a hard disk drive and that stores therein a lattice point group generation program; and
a second controller that includes a central processing unit, read only memory, and random access memory and that executes the lattice point group generation program to function as a sequence generating section and a lattice point generating section, the sequence generating section
(i) obtains a maximum number Smax of lattice points allocatable to the color conversion table for the image forming apparatus, the maximum number Smax being determined depending on a capacity of the first storage device of the image forming apparatus,
(ii) calculates a quotient n using the following equation by dividing a difference by 6, the difference being obtained by subtracting 8 from the maximum number Smax, and $$n = \text{FLOOR}\left[\frac{Smax - 8}{6}\right]$$

(iii) generates three van der Corput sequences in which the number of terms is equal to the quotient n and whose basis is a positive integer greater than or equal to 2; and the lattice point generating section
(i) performs nesting on the three van der Corput sequences,
(ii) performs a matrix transformation on a nested array to acquire an array having n rows and three columns to generate a group of three-dimensional points, the number of three-dimensional points being equal to the quotient n,
(iii) generates a group of mapping points by changing combinations of three channels of colors in the RGB color space of the three-dimensional points, the group of mapping points being part of a group of lattice points to be contained in the color conversion table, and
(iv) generates eight lattice points corresponding to eight vertices of the RGB color space, the eight lattice points being part of the group of lattice points to be contained in the color conversion table.

* * * * *